(12) United States Patent
Yamashita et al.

(10) Patent No.: US 6,509,707 B2
(45) Date of Patent: Jan. 21, 2003

(54) INFORMATION PROCESSING DEVICE, INFORMATION PROCESSING METHOD AND STORAGE MEDIUM

(75) Inventors: Junichi Yamashita, Saitama (JP); Hiroaki Ogawa, Chiba (JP); Hitoshi Honda, Tokyo (JP); Helmut Lucke, Tokyo (JP); Hideshi Tamaru, Kanagawa (JP); Yaeko Fujita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/749,360

(22) Filed: Dec. 27, 2000

(65) Prior Publication Data

US 2001/0020837 A1 Sep. 13, 2001

(30) Foreign Application Priority Data

Dec. 28, 1999 (JP) ............................................ 11-375773

(51) Int. Cl.[7] .............................................. G05B 19/10
(52) U.S. Cl. ............. 318/567; 318/568.12; 318/568.13; 318/568.16; 901/1
(58) Field of Search ............................. 318/567, 568.12, 318/568.13, 568.16, 569; 901/1; 706/14, 18; 700/31

(56) References Cited

U.S. PATENT DOCUMENTS 4,894,777 A * 1/1990 Negishi et al. ............. 318/567
6,175,772 B1 * 1/2001 Kamiya et al. ............... 700/31
6,219,657 B1 * 4/2001 Hatayam ..................... 706/14

* cited by examiner

*Primary Examiner*—Karen Masih
(74) *Attorney, Agent, or Firm*—Frommer Lawrence & Haug LLP; William S. Frommer; Gordon Kessler

(57) ABSTRACT

A robot performing a variety of actions is disclosed.

The voice of a user picked up by a microphone is recognized by a voice recognizer. A gesture of the user picked up by a CCD is recognized by an image recognizer. A behavior decision unit decides the behavior to be taken by the robot based on the voice information provided by the voice recognizer and the image information provided by the image recognizer.

15 Claims, 19 Drawing Sheets

FIG. 8

| IMAGE RECOGNITION RESULT | SUPPLEMENTARY INFORMATION | | VOICE RECOGNITION RESULT | BEHAVIORS |
|---|---|---|---|---|
| BECKONING | USER'S POSITION | | IMPERATIVE FORM, SUCH AS "COME OVER HERE", FOLLOWED BY CALLING ROBOT BY NAME | ROBOT APPROACHES, GETS AWAY FROM, OR IGNORES USER |
| USER POINTING A FINGER AT | DIRECTION OF FINGER | | EXCLAMATORY EXPRESSIONS, SUCH AS AAHS, GEE, ETC. | ROBOT LOOKS TOWARD DIRECTION THE USER'S FINGER POINTS AT |
| | | DEMONSTRATIVE PRONOUN | | ROBOT RESPONDS TO DEMONSTRATIVE PRONOUN BY PICKING UP AN OBJECT PRESENT IN THE DIRECTION THE USER'S FINGER POINTS AT |
| | HAND ME | NAME OF AN OBJECT | | ROBOT SEARCHES FOR THE OBJECT IN DIRECTION THE FINGER POINTS AT |
| SHAKING HANDS | | | GREETINGS | ROBOT OFFERS ITS HAND |
| | | | EXCHANGING GOOD-BYE | ROBOT WAVES A HAND, GETS AWAY FROM THE USER, AND TURNS OFF POWER |
| WAVING A HAND | | | GREETINGS (HALLO) | ROBOT APPROACHES AND EXCHANGES GREETINGS |
| | | | NO RESULTS | ROBOT WAVES A HAND |
| NO RESULTS | | | CALLING | ROBOT LOOKS FOR THE USER |

BEHAVIOR TABLE

BEHAVIOR TABLE STORAGE UNIT 77

FIG. 18

| | BINARY MEASURE | TRIPLE MEASURE | QUADRUPLE MEASURE | OTHER MEASURES |
|---|---|---|---|---|
| 0 - 60 | DANCE A | DANCE A | DANCE A | DANCE A |
| 70 - 120 | DANCE B | DANCE C | DANCE D | DANCE A |
| 120 - 180 | DANCE E | DANCE F | DANCE G | DANCE A |

BEHAVIOR TABLE

BEHAVIOR TABLE STORAGE UNIT

77

INFORMATION PROCESSING DEVICE, INFORMATION PROCESSING METHOD AND STORAGE MEDIUM

BACKGROUND OF THE INVENTION

1. Field of the Invention

The present invention relates to an information processing device, an information processing method, and a storage medium, and, more particularly, to an information processing device, and an information processing method for deciding a behavior of a robot using voice information and image information, and to a storage medium for storing a software program for the information processing method.

2. Description of the Related Art

A number of toy robots (sometimes stuffed) is now commercially available. Some robots output a synthesized voice in response to a pressing of a touch switch. Other robots recognize a voice spoken by a user and respond by talking, and the user thus enjoys conversations with such a robot.

There are also commercially available robots which pick up an image for image recognition, and estimate the situation surrounding them, and move in a self-controlled manner.

The voice recognition is subject to an erratic recognition when the voice of a user is not so clear. Particularly, when the speech of the user includes a demonstrative pronoun which is not clearly defined and open to several interpretations, the robot cannot recognize what object is indicated by the pronoun.

The above-mentioned robots move in a self-controlled fashion, depending on either voice or image, and have difficulty working on both voice information and image information.

SUMMARY OF THE INVENTION

Accordingly, it is an object of the present invention to provide a robot which reliably performs voice recognition using voice and image information, thereby offering a variety of motions to a user.

In one aspect of the-present invention, an information processing device for use in a robot includes a voice recognizer for recognizing a voice, an image recognizer for recognizing an image, and a decision unit for deciding the behavior of the robot based on at least one of the voice recognition result provided by the voice recognizer and the image recognition result provided by the image recognizer.

The information processing device may include a storage unit for storing a table that describes the relationship of the voice recognition result provided by the voice recognizer, the image recognition result provided by the image recognizer, and the behavior of the robot that is uniquely decided in accordance with the voice recognition result and the image recognition result.

The decision unit may decide the behavior of the robot in accordance with the image recognition result uniquely determined by the image recognizer when the voice recognition is not uniquely determined by the voice recognizer.

The decision unit may decide the behavior of the robot in accordance with the voice recognition result uniquely determined by the voice recognizer when a plurality of objects is present within the area of an image recognized by the image recognizer.

The image recognizer may recognize an image of a scene which is present in a direction to which one of predetermined portions of a user, from among a finger, a face, an eye, and a jaw of the user, points.

The information processing device may further include a storage unit for storing data of gestures performed by a user, wherein the image recognizer recognizes the image of the user to detect a gesture matching the gesture data stored in the storage unit, and regard the detected gesture as an image recognition result.

The information processing device may further include a detector for detecting the face of a user, and a range finder for measuring a distance between the user and the robot based on the size of the face of the user detected by the detector, wherein the decision unit decides the behavior of the robot using the measured distance.

The voice recognizer may detect a rhythm contained in background sounds, and treat the detected rhythm as a voice recognition result.

The voice recognizer may detect an acoustic phenomenon from background sounds, and treat the detected acoustic phenomenon as a voice recognition result.

In another aspect of the present invention, an information processing method of an information processing device for use in a robot, includes a voice recognizing step for recognizing a voice, an image recognizing step for recognizing an image, and a decision step for deciding the behavior of the robot based on at least one of the voice recognition result provided in the voice recognizing step and the image recognition result provided in the image recognizing step.

In yet another aspect of the present invention, a software program for an information processing device for use in a robot, includes program codes for performing a voice recognizing step for recognizing a voice, an image recognizing step for recognizing an image, and a decision step for deciding the behavior of the robot based on at least one of the voice recognition result provided in the voice recognizing step and the image recognition result provided in the image recognizing step.

In still another aspect of the present invention, a storage medium stores software program for an information processing device for use in a robot. The software program includes program codes for performing a voice recognizing step for recognizing a voice, an image recognizing step for recognizing an image, and a decision step for deciding the behavior of the robot based on at least one of the voice recognition result provided in the voice-recognizing step and the image recognition result provided in the image recognizing step.

BRIEF DESCRIPTION OF THE DRAWINGS

FIG. 8 is a table listing behaviors stored in a behavior table storage unit;

FIG. 18 shows another behavior table stored in the behavior table storage unit;

DESCRIPTION OF THE PREFERRED EMBODIMENTS

Figure 1:
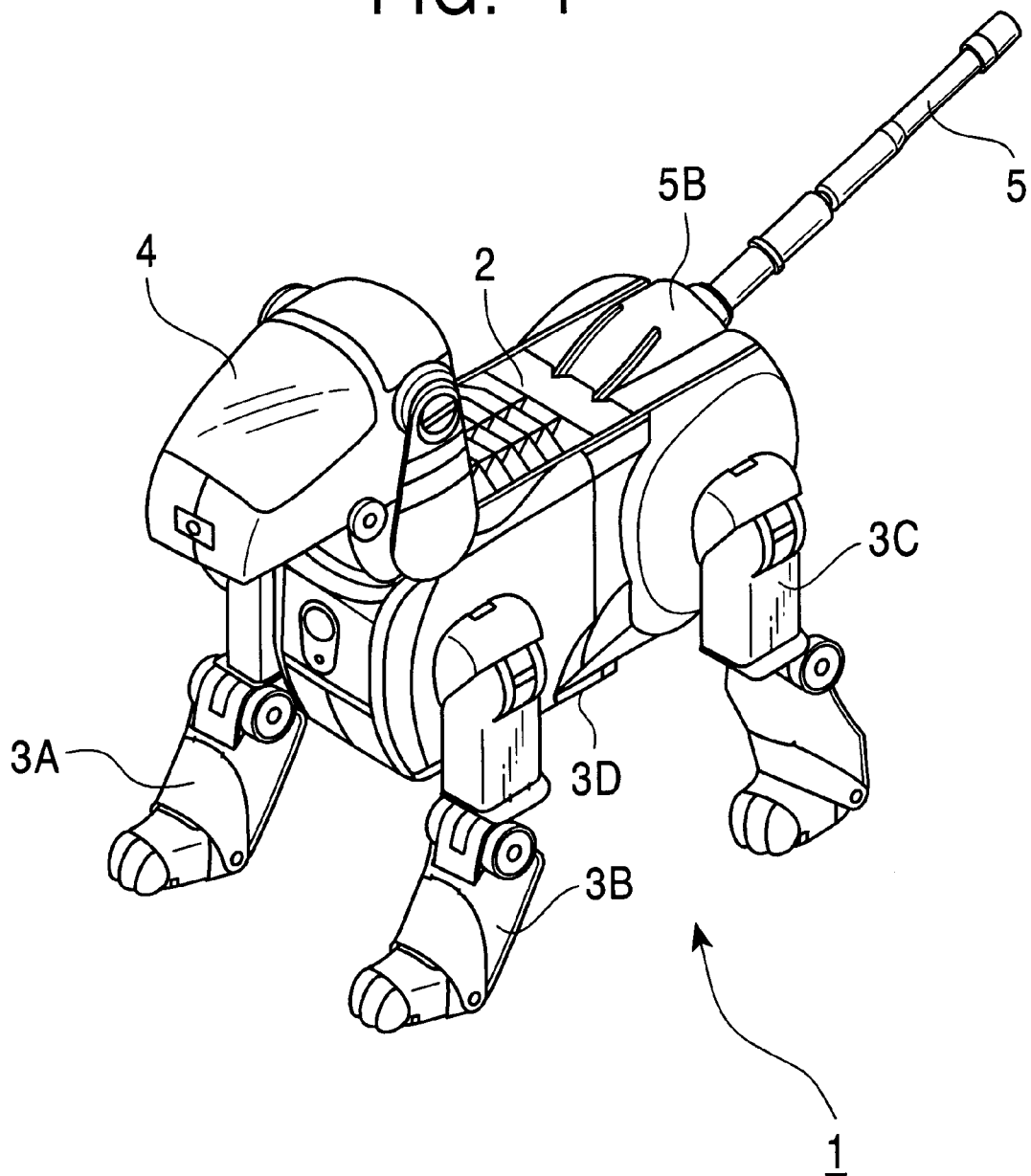
FIG. 1 is an external perspective view of one embodiment of the robot of the present invention.
Figure 2:
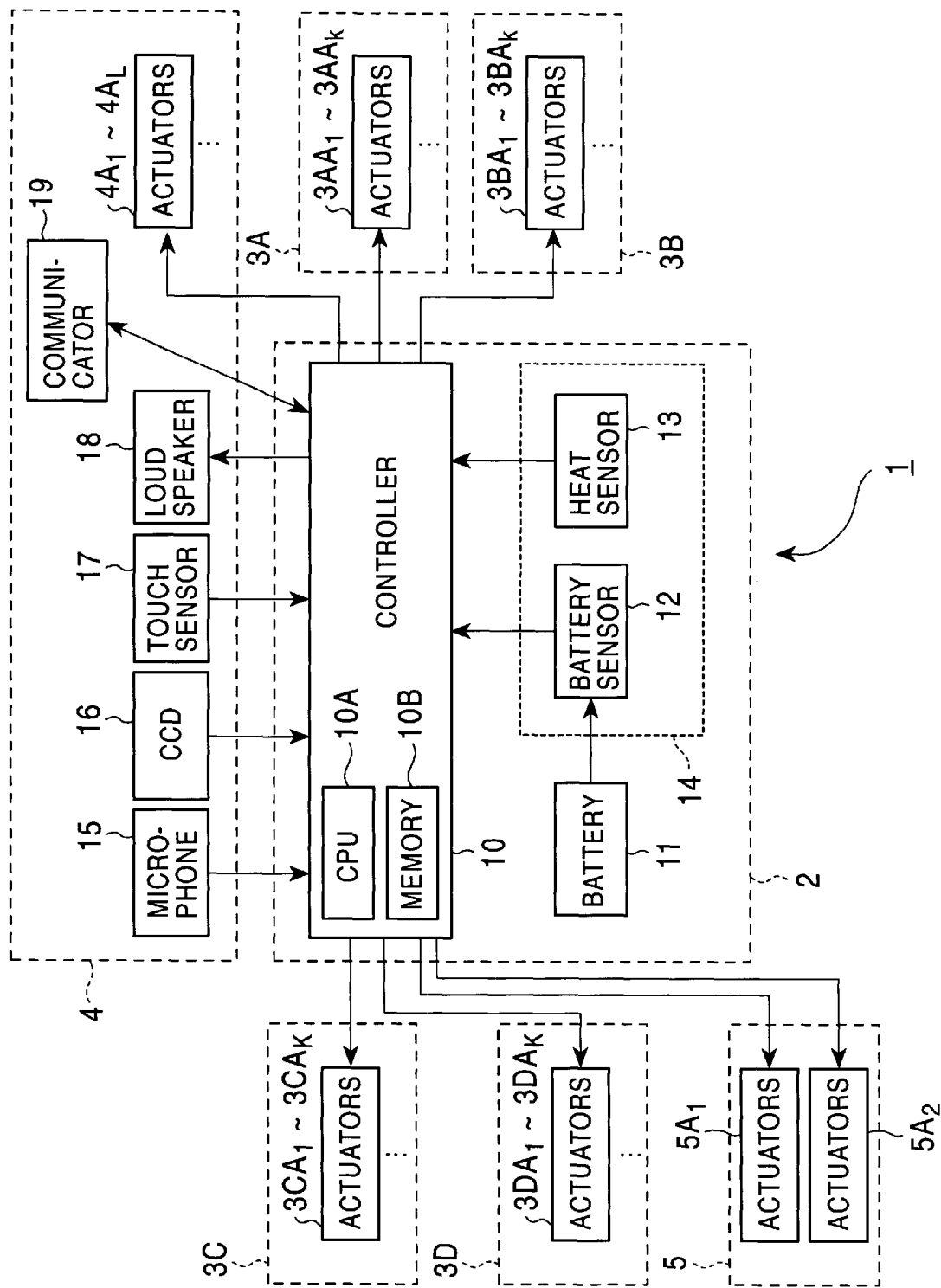
FIG. 2 is a block diagram showing the internal construction of the robot shown in FIG. 1.

FIG. 1 is an external perspective view of one embodiment of the robot 1 of the present invention, and FIG. 2 shows an electrical construction of he robot 1.

The robot 1 of this embodiment models a dog. Leg units 3A, and 3B, and 3C, and 3D are respectively connected to a torso unit 2 on the front left and right sides and back left and right sides thereof. A head unit 4 and a tail unit 5 are respectively connected to the torso unit 2 on the front and back thereof.

The tail unit 5 extends from a base portion 5B of the torso unit 2 with two degrees of freedom so that-the tail unit 5 is curved or pivoted. The torso unit 2 houses a controller 10 for controlling the entire robot 1, a battery 11 as a power source for the robot 1, and internal sensors 14, such as a battery sensor 12 and a heat sensor 13.

The head unit 4 includes a microphone 15 corresponding to the "ear" of the dog, a CCD (Charge-Coupled Device) camera 16 corresponding to the "eye" of the dog, a touch sensor 17 corresponding to the touch of the dog, and a loudspeaker 18 corresponding to the "mouth" of the dog.

Actuators $3AA_1$ through $3AA_K$, $3BA_1$ through $3BA_K$, $3CA_1$ through $3CA_K$, and $3DA_1$ through $3DA_K$, are respectively arranged in the leg units 3A, 3B, 3C, and 3D, and at respective joints between the leg units 3A, 3B, 3C, and 3D and the torso unit 2. Actuators $4A_1$ through $4A_L$ are arranged at the joint between the head unit 4 and the torso unit 2, and actuators $5A_1$ and $5A_2$ are arranged at the joint between the tail unit 5 and the torso unit 2. These joints allow the respective connected units to rotate in a predetermined degrees of freedom.

The microphone 15 in the head unit 4 picks up ambient sounds including the voice of a user, and outputs the resulting sound signal to the controller 10. The CCD camera 16 picks up a picture of the surroundings of the robot 1, and sends the resulting image signal to the controller 10.

The touch sensor 17, arranged on the top of the head unit 4, detects a pressure of a physical action exerted thereon, such as "being stroked" or "being beaten", and issues a detected result to the controller 10 as a pressure signal.

The battery sensor 12 in the torso unit 2 detects power remaining in the battery 11, and outputs a detected power level to the controller 10 as a remaining power indicating signal. The heat sensor 13 detects heat buildup within the robot 1, and sends a detected result to the controller 10 as a heat level signal.

The controller 10 includes a CPU (Central Processing Unit) 10A and a memory 10B. The CUP 10A performs a variety of processes by executing a control program stored in the memory 10B. Specifically, the controller 10 determines the situation surrounding the robot 1, a command from a user, and the presence or absence of an action from the user, based on the voice signal, the image signal, the pressure signal, the battery remaining power indicating signal, and the heat level signal respectively provided by the microphone 15, the CCD camera 16, the touch sensor 17, the battery sensor 12, and the heat sensor 13.

Based on the determination result, the controller 10 decides what action or behavior to take. In response to the determination result, any of the actuators $3AA_1$ through $3AA_K$, $3BA_1$ through $3BA_K$, $3CA_1$ through $3CA_K$, $3DA_1$ through $3DA_K$, $4A_1$ through $4A_L$, and $5A_1$ and $5A_2$ are driven as necessary. The head unit 4 may be pivoted vertically or laterally, the tail unit 5 may be wagged, the leg units 3A through 3D may be driven, thereby the robot 1 takes any action such as quadrupedal walking.

The controller 10 synthesizes a sound as necessary, and outputs the synthesized sound through the loudspeaker 18. LEDs (Light Emitting Diodes) (not shown) arranged on the positions of the eyes of the robot 1 may be turned on, may be extinguished, or may blink.

In this way, the robot 1 takes action in a self-controlled fashion in response to the situation surrounding itself.

Figure 3:
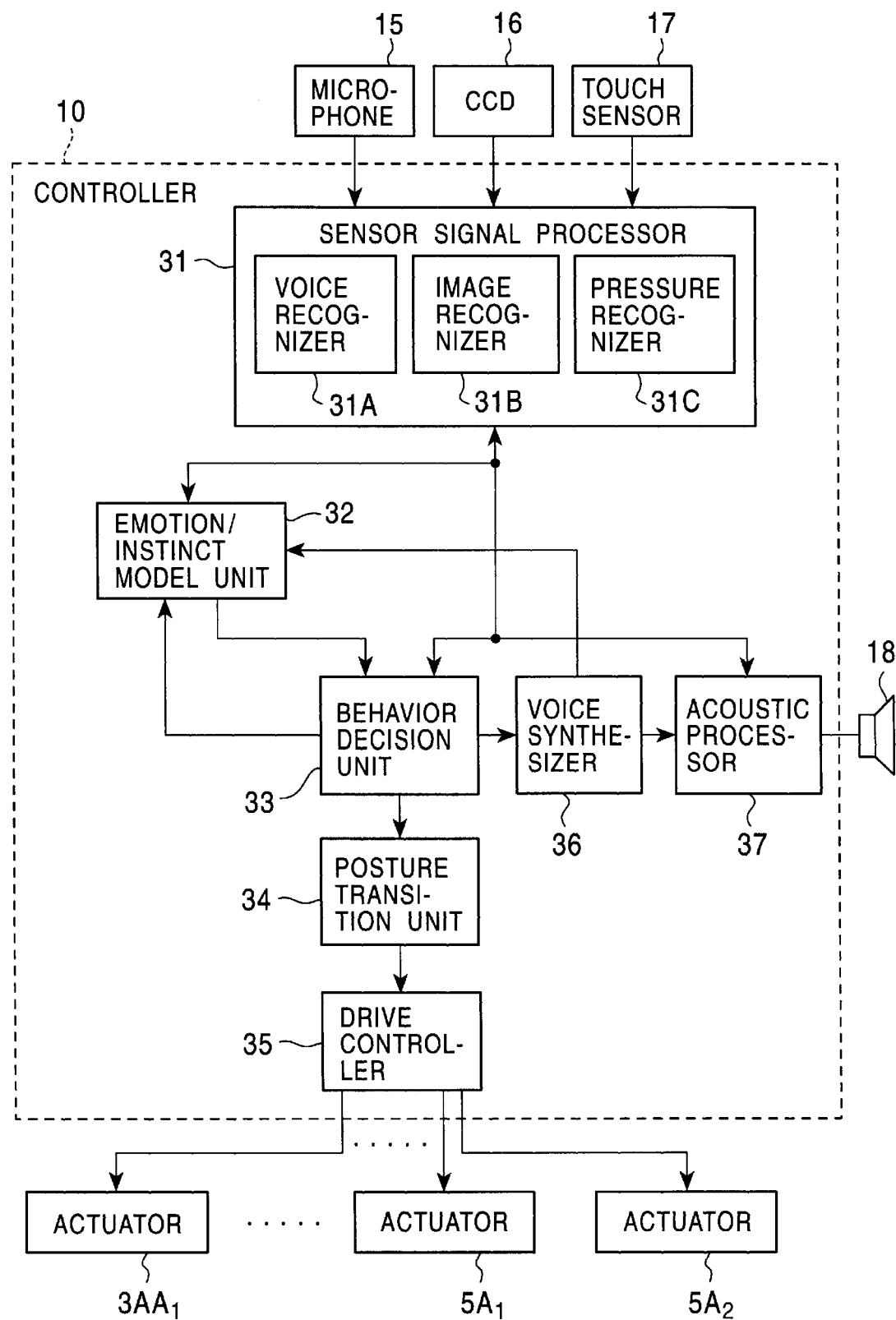
FIG. 3 is a functional block diagram showing a controller of FIG. 2.

FIG. 3 is a functional block diagram of the controller 10 shown in FIG. 2. The robot 1 works in accordance with the functional block diagram shown in FIG. 3 when the CUP 10A executes the control program stored in the memory 10B.

The controller 10 includes a sensor signal processor 31 for recognizing a particular situation surrounding the robot 1, an emotion/instinct model unit 32 for expressing an emotion and the state of instinct of the robot 1, a behavior decision unit 33 for deciding an action to be taken based on the recognition result provided by the sensor signal processor 31, a posture transition unit 34 for driving the robot 1 for the action in accordance with the decision result provided by the behavior decision unit 33, a drive controller 35 for driving and controlling the actuators 3AA, through $5A_2$, a voice synthesizer 36 for synthesizing a sound, and an acoustic processor 37 for controlling the output of the voice synthesizer 36.

The sensor signal processor 31 recognizes a particular situation surrounding the robot 1, a particular action taken by the user, and an instruction given by the user in accordance with the voice signal, the image signal, and pressure signal respectively provided by the microphone 15, the CCD camera 16, and the touch sensor 17. The sensor signal processor 31 outputs, to the emotion/instinct model unit 32 and the behavior decision unit 33, recognition information indicating the recognition results.

Specifically, the sensor signal processor 31 includes a voice recognizer 31A. Under the control of the behavior decision unit 33, the voice recognizer 31A performs voice recognition on the voice signal from the microphone 15. The voice recognizer 31A reports, to the emotion/instinct model unit 32 and the behavior decision unit 33, the voice recognition results such as commands or the like, for example, "Walk", "Lie down", "Follow the ball".

The sensor signal processor 31 also includes an image recognizer 31B. The image recognizer 31B performs image recognition on the image signal from the CCD camera 16. For example, when the image recognizer 31B has detected a "red and round object" or a "plane vertically extending from a, ground and being taller than a predetermined height", the image recognizer 31B reports, to the emotion/instinct model unit 32 and the behavior decision unit 33, the image recognition results which may indicate that "there is a ball" or that "there is a wall". The sensor signal processor 31 also recognizes a gesture taken by the user, and reports the corresponding recognition result to the behavior decision unit 33.

The sensor signal processor 31 further includes a processor recognizer 31C. The processor recognizer 31C processes the pressure signal from the touch sensor 17. When the touch sensor 17 detects a pressure of a short duration of time at a level higher than a predetermined threshold, the processor recognizer 31C recognizes that the robot 1 is being "beaten (or chastised)". When the touch sensor 17 detects a pressure of a long duration of time at a level lower than a predetermined threshold, the processor recognizer 31C recognizes as being "stroked (or praised)". The processor recognizer 31C then feeds the recognition result to the emotion/instinct model unit 32 and the behavior decision unit 33.

The emotion/instinct model unit 32 manages the emotion model expressing emotional states and the instinct model of the robot 1. The behavior decision unit 33 decides a next behavior to take based on the recognition result of the sensor signal processor 31, the emotion/instinct state information of the emotion/instinct model unit 32, and elapsed time. The behavior decision unit 33 then feeds, to the posture transition unit 34, the behavior information as behavior command information.

In response to the behavior command information from the behavior decision unit 33, the posture transition unit 34 creates posture transition information which is used to cause the robot 1 to transition from a current posture to a next posture. The posture transition information is fed to the drive controller 35. In response to the posture transition information from the posture transition unit 34, the drive controller 35 generates control signals for driving the actuators $3AA_1$ through $5A_1$, and respectively outputs the control signals to the actuators $3AA_1$ through $5A_2$. The actuators $3AA_1$ through $5A_1$ and $5A_2$ are driven in accordance with the respective control signals. The robot 1 thus operates in a self-controlled fashion.

Figure 4:
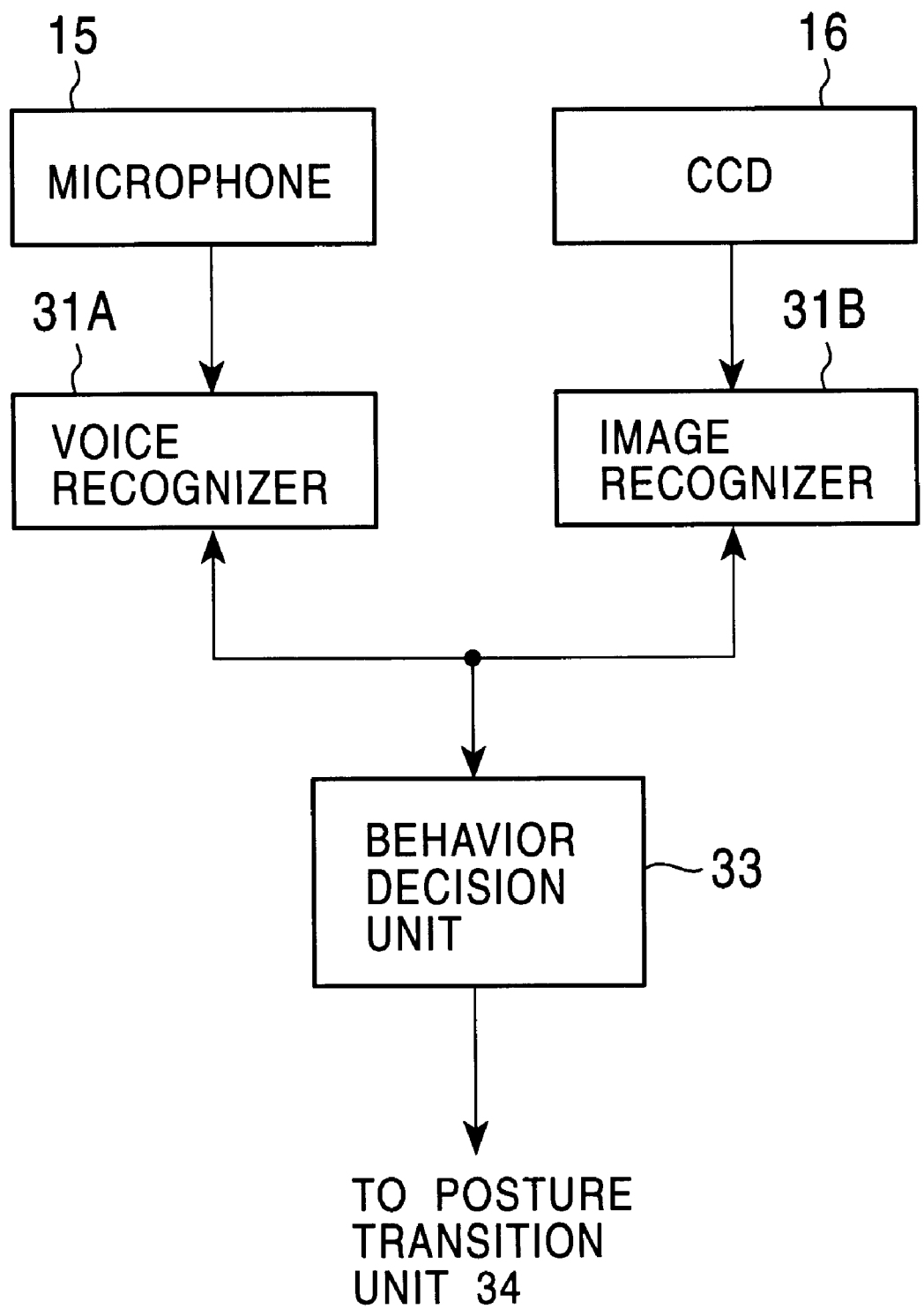
FIG. 4 is a functional block diagram showing a portion of the robot that performs voice and image recognition.

The robot 1 recognizes the voice and gesture of the user, thereby deciding the behavior thereof. FIG. 4 shows a portion of the system, shown in FIG. 3, which decides the, behavior of the robot subsequent to the recognition of the voice and the gesture of the user. Referring to FIG. 4, there are shown the microphone 15 and the voice recognizer 31A for recognizing the voice of the user, the CCD camera 16 and the image recognizer 31B for recognizing the gesture of the user, and the behavior decision unit 33. Based on the recognition results provided by the voice recognizer 31A and the image recognizer 31B, the behavior decision unit 33 decides the next action to be taken by the robot 1.

Figure 5:
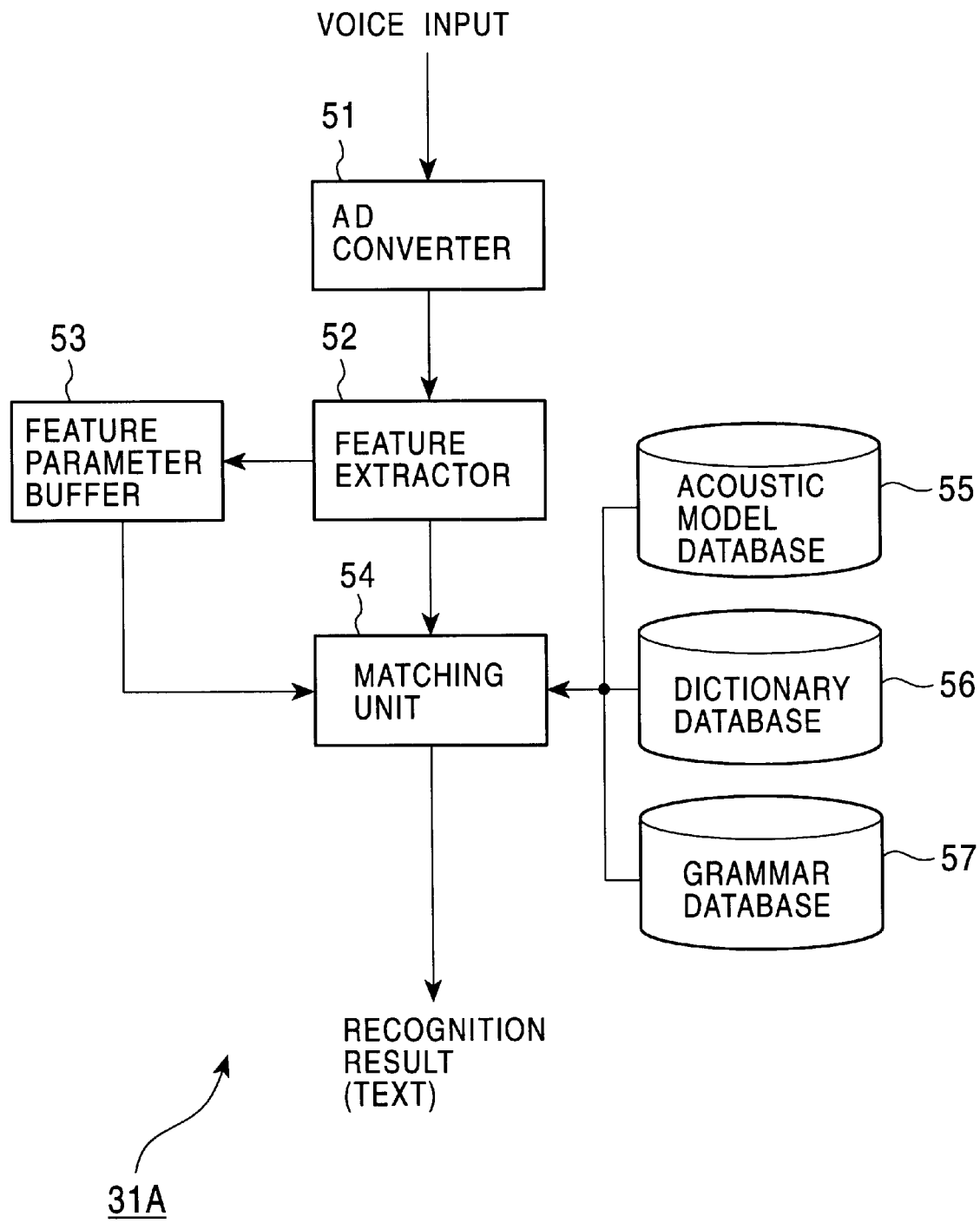
FIG. 5 is a block diagram of the internal construction of a voice recognizer.

FIG. 5 illustrates the voice recognizer 31A in detail. The voice of the user is input to the microphone 15, which converts the voice of the user into an electrical voice signal. The electrical voice signal is fed to an analog-to-digital (AD) converter 51 in the voice recognizer 31A. The AD converter 51 samples, quantizes and thus converts the electrical voice signal, which is an analog signal, into a digital voice signal. This digital voice signal is fed to a feature extractor 52.

The feature extractor 52 extracts feature parameters, such as a spectrum, a linear prediction coefficient, a cepstrum coefficient, and a line spectrum pair, from the voice data from the AD converter 51, every appropriate number of frames. The feature extractor 52 then feeds the feature parameters to the feature parameter buffer 53 and the matching unit 54. The feature parameter buffer 53 temporarily stores the feature parameters from the feature extractor 52.

Based on the feature parameters from the feature extractor 52 and the feature parameters from the feature parameter buffer 53, the matching unit 54 recognizes the voice input to the microphone 15 while referencing an acoustic model database 55, a dictionary database 56, and a grammar database 57.

The acoustic model database 55 stores an acoustic model that represents an acoustic feature such as phonemes and syllables in a voice in a language to be recognized. As an acoustic model, a HMM (Hidden Markov Model) may be employed. The dictionary database 56 stores a dictionary of words which contains information of the pronunciation (phonological information) of each word to be recognized. The grammar database 57 stores a grammar which describes how each word registered in the dictionary database 56 is chained. The grammar may be a context-free grammar (CFG), or a rule based on word chain probability (N-gram).

The matching unit 54 produces a word (a word model) by connecting acoustic models stored in the acoustic model database 55 through referencing the dictionary in the dictionary database 56. The matching unit 54 further connects several word models by referencing the grammar stored in the grammar database 57, and processes the connected word models through the continuous HMM method based on the feature parameters, thereby recognizing the voice input to the microphone 15. The voice recognition result of the matching unit 54 is thus output in a text.

When the matching unit 54 needs to reprocess the input voice, the feature parameters stored in the feature parameter buffer 53 is used. In this way, there is no need for requesting the user to speak again.

Figure 6:
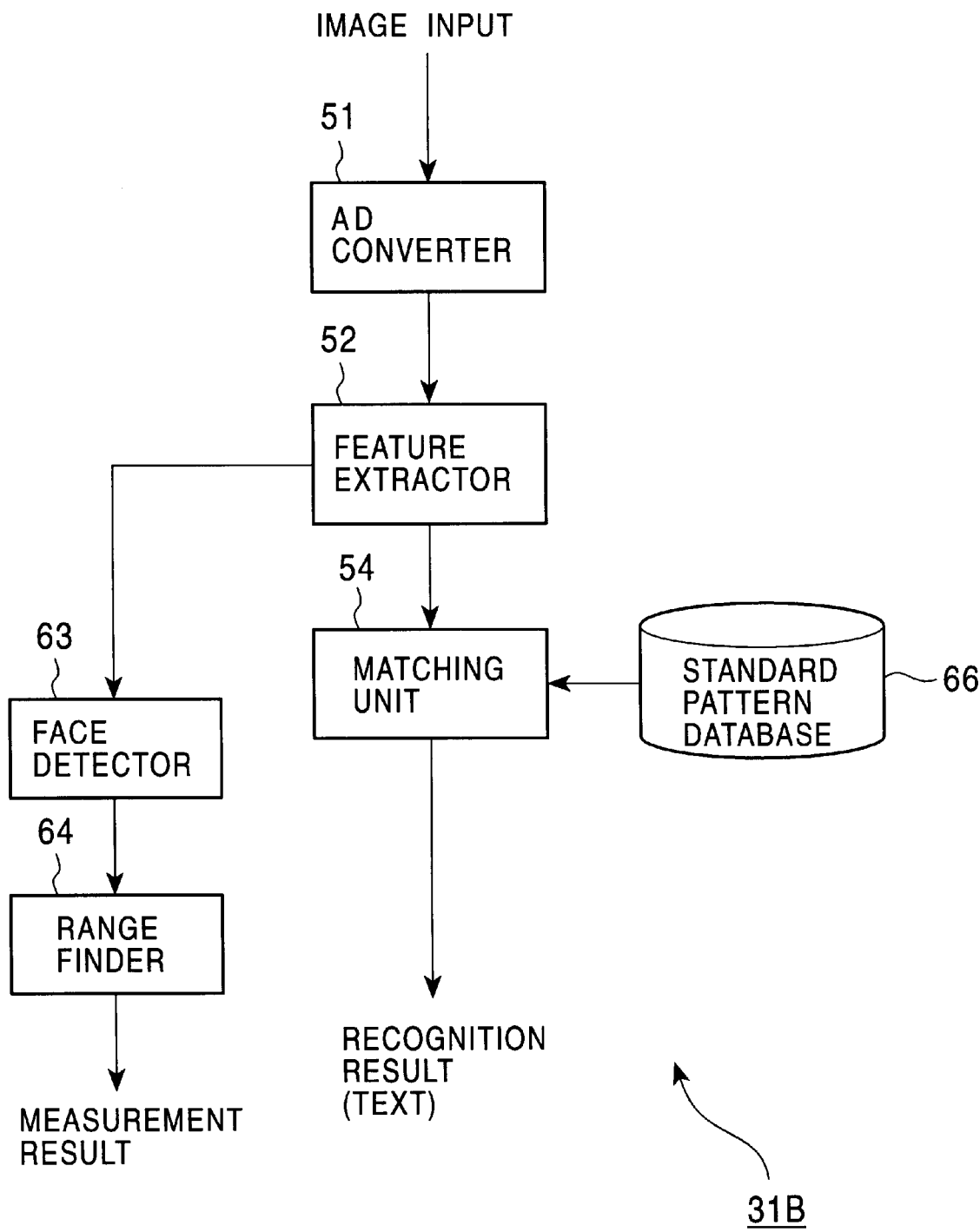
FIG. 6 is a block diagram of the internal construction of an image recognizer.

FIG. 6 shows the internal construction of the image recognizer 31B. An image picked up by the CCD camera 16 is input to an AD converter 61 in the image recognizer 31B. The image data is converted by the AD converter 61 into digital image data, which is then output to a feature extractor 62. The feature extractor 62 extracts, from the input image data, features, such as an edge of an object and density variations in the image, thereby determining feature quantities such as feature parameters or feature vectors.

The feature quantities extracted by the feature a extractor 62 are output to a face detector 63. The face detector 63 detects the face of the user from the input feature quantity, and outputs a detected result to a range finder 64. The range finder 64 measures the range to the user using the output from the face detector 63, while measuring the direction toward which the user's face looks. The measured results are output to the behavior decision unit 33.

The range to the user may be measured from a variation in the size of the face. For example, the range measurement may use the method described by Henry A. Rowley, Shumeet Baluja, and Takeo Kanade, in a paper entitled "Neural Network-Based Frace Detection" IEEE Pattern Analysis and Machine Intelligence.

In this embodiment, the size of the face is measured using a single image signal line. Alternatively, two image signals (of a stereo image) on two signal lines may be compared for matching to measure the range to the user. For example, an extraction method of three-dimensional information from a stereo image is disclosed in a paper entitled "Section 3.3.1 Point Pattern Matching, Image Analysis Handbook", Editors, Takagi, Shimoda, University of Tokyo Press.

The feature quantity extracted by the feature extractor 62 is output to the face detector 63 and a matching unit 65. The matching unit 65 compares the input feature quantity with pattern information stored in a standard pattern database 66, and feeds the comparison result to the behavior decision unit 33. The data stored in the standard pattern database 66 contains image data for a gesture and data indicating the feature of a behavior pattern. For gesture recognition, reference is made to a paper authored by Seiji INOKUCHI and entitled "Gesture Recognition for Kansei Expression", Journal of the Robotics Society of Japan, Vol. 17, No. 7, pp. 933–936, 1999.

Figure 7:
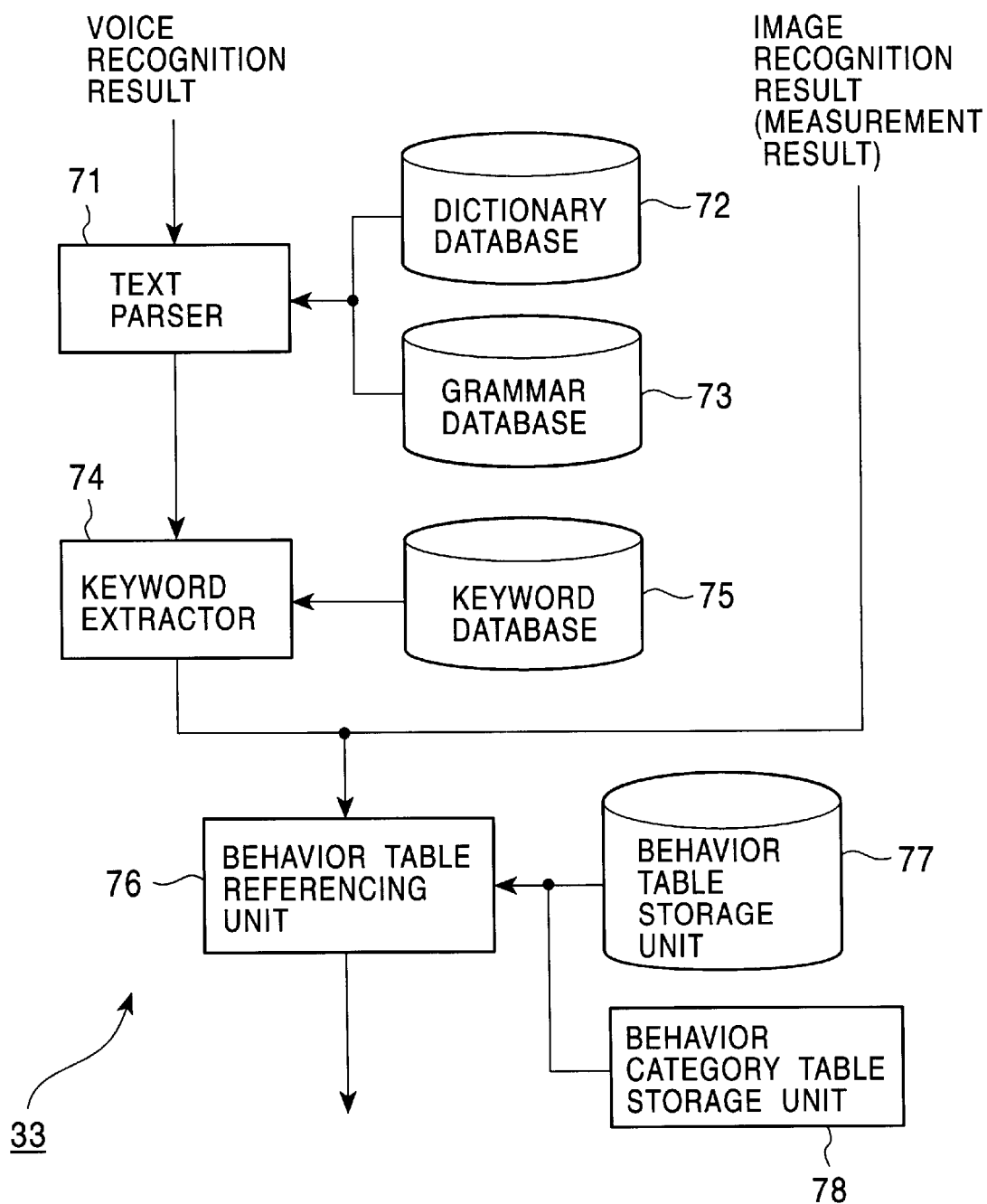
FIG. 7 is a block diagram showing the internal construction of a behavior decision unit.

The recognition result provided by the voice recognizer 31A and the recognition result (measurement result) provided by the image recognizer 31B are input to the behavior decision unit 33. FIG. 7 shows the internal construction of the behavior decision unit 33. The voice recognition result provided by the voice recognizer 31A is input to a text parser 71 in the behavior decision unit 33. The text parser 71 performs morpheme analysis and syntax analysis on the input voice recognition result based on the data stored in a dictionary database 72 and a grammar database 73. The text parser 71 extracts the meaning and intention of the input voice based on the content of the dictionary in the dictionary database 72.

Specifically, the dictionary database 72 stores parts of speech information required for applying words and grammar, and meaning information for individual words. The grammar database 73 stores data that describes constraints in chaining words based on individual-word information stored in the dictionary database 72. Using these pieces of data, the text parser 71 analyzes the input voice recognition result.

The grammar database 73 stores data required for text parsing, such as regular grammar, context-free grammar, statistical establishment of word chain, and language theory including semantics such as HPSG (Head-driven Phrase Structure Grammar) for semantical parsing.

The analysis result provided by the text parser 71 is output to a keyword extractor 74. In response to the input analysis result, the keyword extractor 74 references the data stored in a keyword database 75, and extracts the intention of the user who has spoken the voice. The extraction result is fed to a behavior table referencing unit 76. The keyword database 75 stores data which indicates the user's intention, such as the expression of exclamation and commands, and which is used as a keyword in keyword spotting. Specifically, an expression serving as an index for voice information in the subsequent stage behavior table referencing unit 76 and a word corresponding to that are stored as data for the keyword.

The behavior table referencing unit 76 decides the behavior of the robot 1, referencing tables respectively stored in a behavior table storage unit 77 and in a behavior category table storage unit 78, in accordance with the extraction result provided by the keyword extractor 74 and the recognition result provided by the image recognizer 31B. The table stored in the behavior table storage unit 77 is now discussed. FIG. 8 shows the table of behaviors stored in the behavior table storage unit 77.

The image recognition results are here divided into "beckoning", "pointing a finger at", "shaking hands", "waving a hand," and "no result". Depending on each image recognition result, supplementary information may or may not be required. Furthermore, the voice recognition result is also referred to.

For example, the image recognition result is found to be the "beckoning", information of where and how far the user is now is required, in other words, the measurement results are required. When the user beckons, an action of "approaching the user" is decided if the voice recognition result indicates a command of "come over here". When the voice recognition result indicates a command of "get away", an action of "getting away" is decided. Even when the user says "come over here", the action of approaching the user is not always decided, as will be discussed later.

The behavior table thus describes one single behavior which is determined by three pieces of information of the gesture of the user (the image recognition result), the voice of the user (the voice recognition result), and the range to the user (the measurement result) depending on the situation of the robot to the user.

Figure 9:
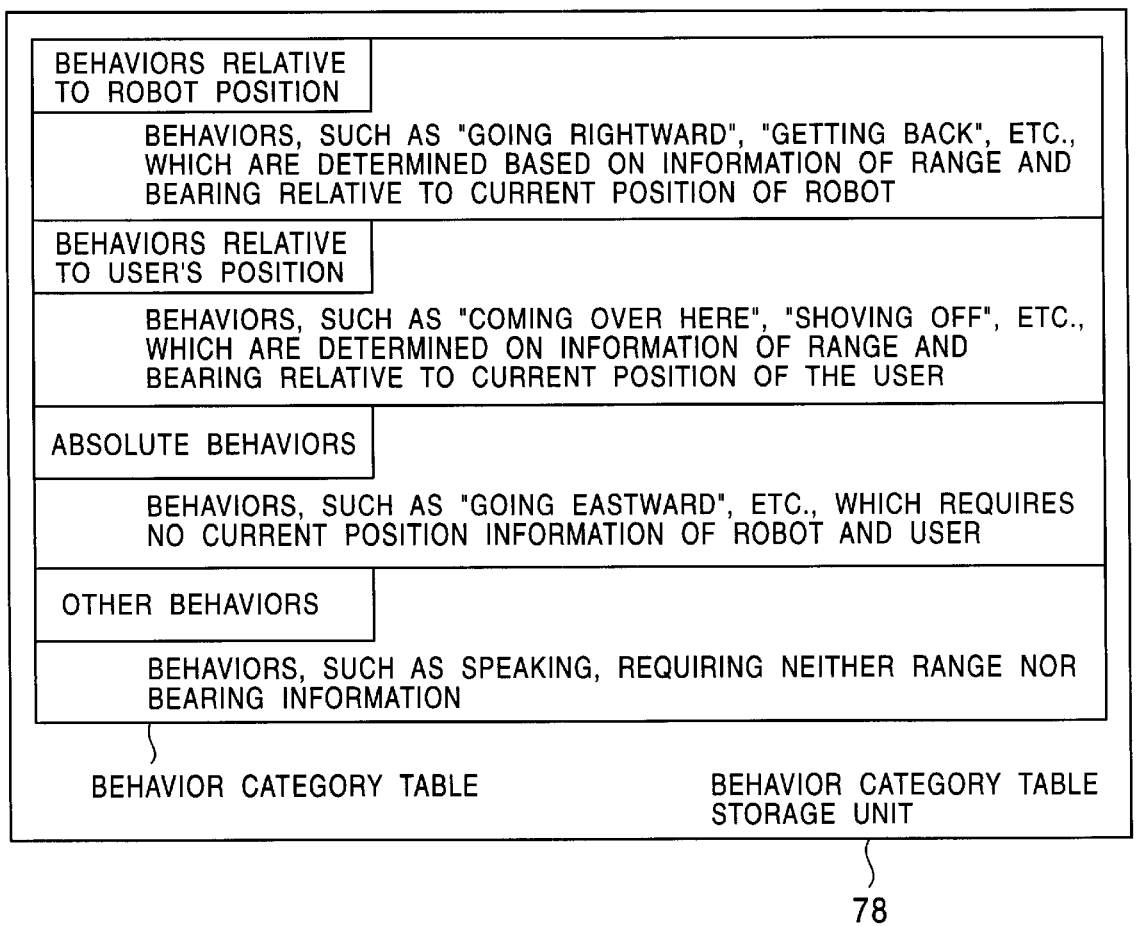
FIG. 9 is a table listing behavior categories stored in a behavior category table storage unit.

FIG. 9 shows a table of behavior categories stored in the behavior category table storage unit 78. The behavior category table lists the categories of the behaviors listed in the behavior table shown in FIG. 8. The behaviors in the table are divided into four categories as listed in FIG. 9: "behaviors relative to the robot position", "behaviors relative to the user's position", "absolute behaviors", and "other behaviors".

The behaviors relative to the robot position include behaviors determined based on the range and bearing to the robot current position. For example, when the user says "go rightward", the robot 1 moves leftward from its own position if the user faces the robot 1 in a face-to-face position with the right side of the user aligned with the left-hand side of the robot.

The behaviors relative to the user's position include behaviors determined based on the range and bearing to the user's current position. For example, when the user says "come over here", the robot 1 determines how far to move to be within a range of 80 cm of the user, for example, and actually moves in accordance with the determination.

The absolute behaviors include behaviors determined without paying attention to the current position information of the robot 1 and the user. For example, when the user says "go eastward", the robot 1 simply moves eastwardly, because an eastward direction is determined regardless of the current robot's own position and the current user's position.

The other behaviors are behaviors needing neither bearing information nor range information, and for example, include a voice generated by the robot 1.

Figure 10:
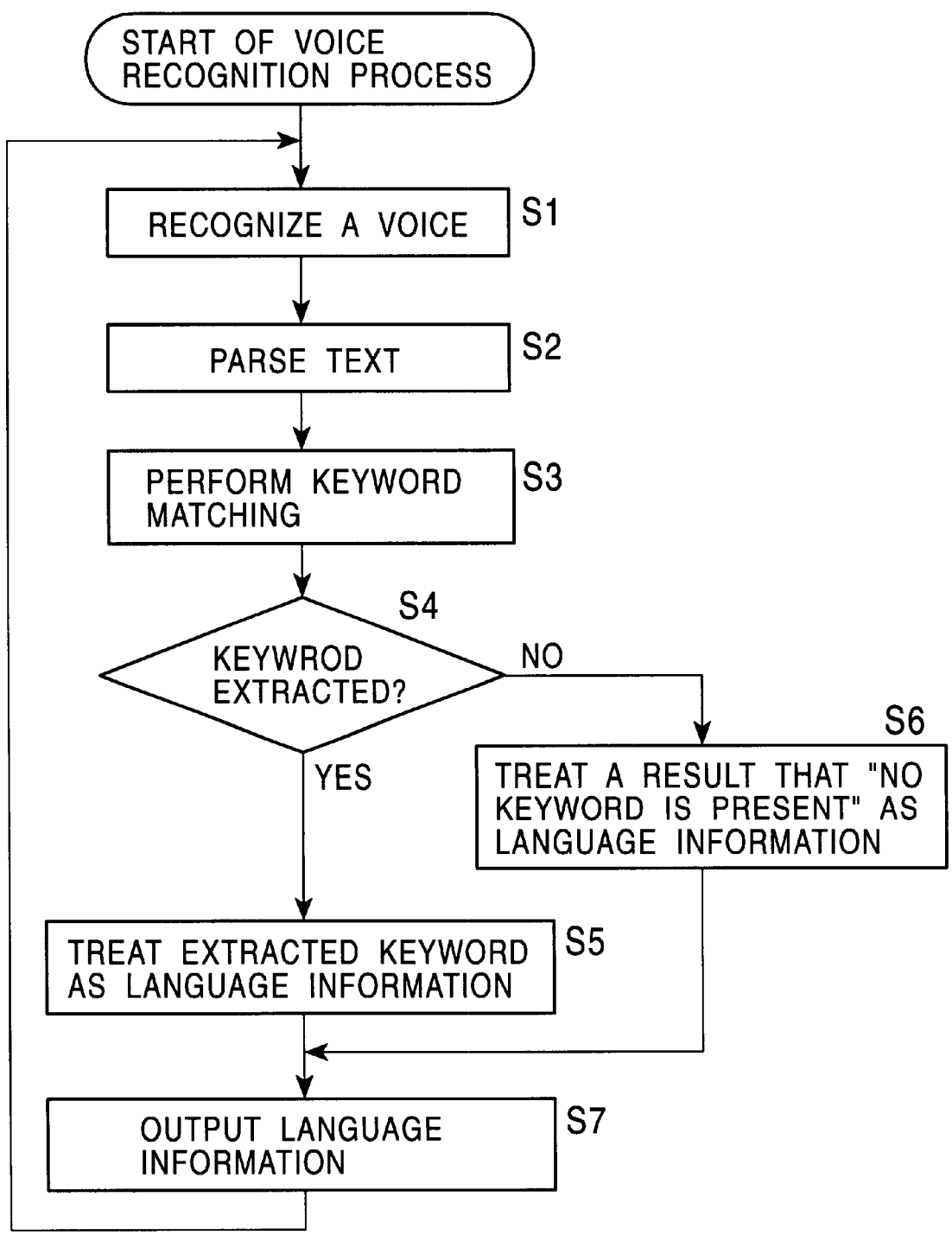
FIG. 10 is a flow diagram showing a voice recognition process.

The decision of the behavior of the robot 1 is now discussed. The behavior of the robot 1 is determined by the voice and the action of the user. The recognition of the user voice is now discussed, referring to a flow diagram shown in FIG. 10. The voice of the user picked up by the microphone 15 is then processed in the voice recognition process of the voice recognizer 31A in step S1.

The voice recognition result provided by the voice recognizer 31A is input to the text parser 71 in the behavior decision unit 33 for text analysis in step S2. In step S3, the keyword extractor 74 performs keyword matching using the analysis result. In step S4, a determination is made of whether a keyword has been extracted. When it is determined in step S4 that a keyword has been extracted, the process goes to step S5.

The keyword extracted in step S5 is regarded as language information. When it is determined in step S4 that no keyword has been extracted, the process proceeds to step S6, and information that there is no keyword is regarded as language information. When either step S5 or step S6 is complete, the language information is output to the behavior table referencing unit 76 in step S7. This process is repeated throughout the operation of the robot 1.

Figure 11:
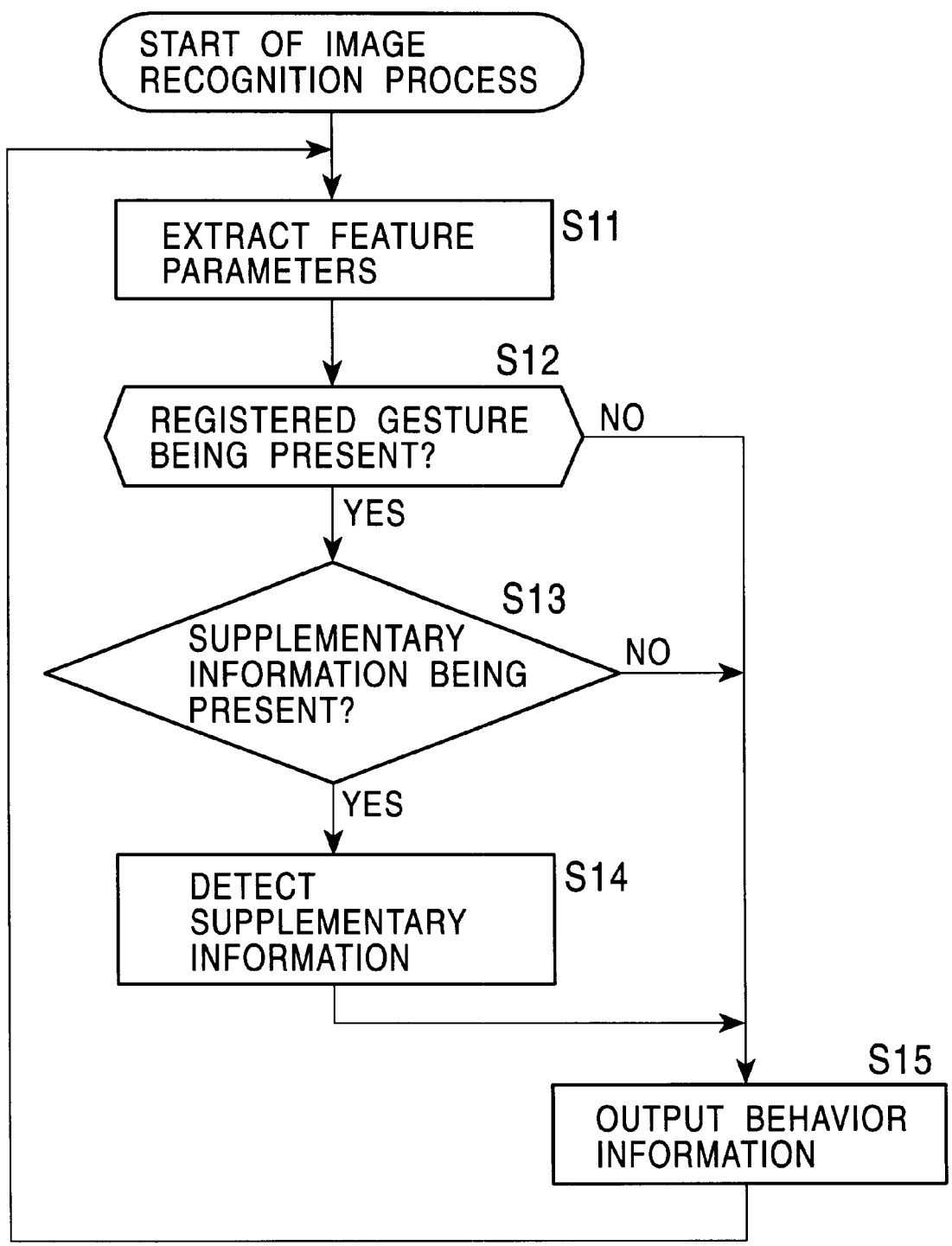
FIG. 11 is a flow diagram showing an image recognition process.

The image of the user is also processed while the above voice recognition process is in progress. The image process of the robot 1 is now discussed, referring to a flow diagram shown in FIG. 11. In step S11, the feature extractor 62 in the image recognizer 31B extracts a feature quantity from the image picked up by the CCD camera 16. It is determined in step S12 whether there is a registered gesture based on the recognition result. Specifically, using the feature quantity output from the feature extractor 62, the matching unit 65 determines whether the recognition result matches any of the gesture pattern information stored in the standard pattern database 66. When the gesture is found to match any of the gesture pattern information, the process proceeds to step S13.

It is then determined in step S13 whether the gesture determined to match the registered one has supplementary information. For example, a gesture having supplementary information may be that the user points the finger of his own at a direction, and in such a case, information of an object which is present in the direction pointed by the finger of the user is the supplementary information. When it is determined in step S13 that the gesture has the supplementary information of its own, the supplementary information is detected in step S14. When the detection of the supplementary information is complete in step S14, the process proceeds to step S15.

When it is determined in step S12 that there is no registered gesture, or when it is determined in step S13 that the gesture is associated with no supplementary information, the process proceeds to step S15. In step S15, the behavior information is output to the behavior table referencing unit 76.

When the process proceeds from step S12 to step S15, the behavior information is that there is no gesture, in other words, the image recognition result indicates no information that decides the behavior to be taken by the robot 1. When the process proceeds from step S13 to step S15, the behavior information contains gesture-related information only. When the process proceeds from step S14 to step S15, the behavior information contains the gesture-related information and the supplementary information.

The image-recognition process is repeated throughout the operation of the robot 1. The supplementary information in step S13 may include the measurement results provided by the face detector 63 and the range finder 64, as required.

Figure 12:
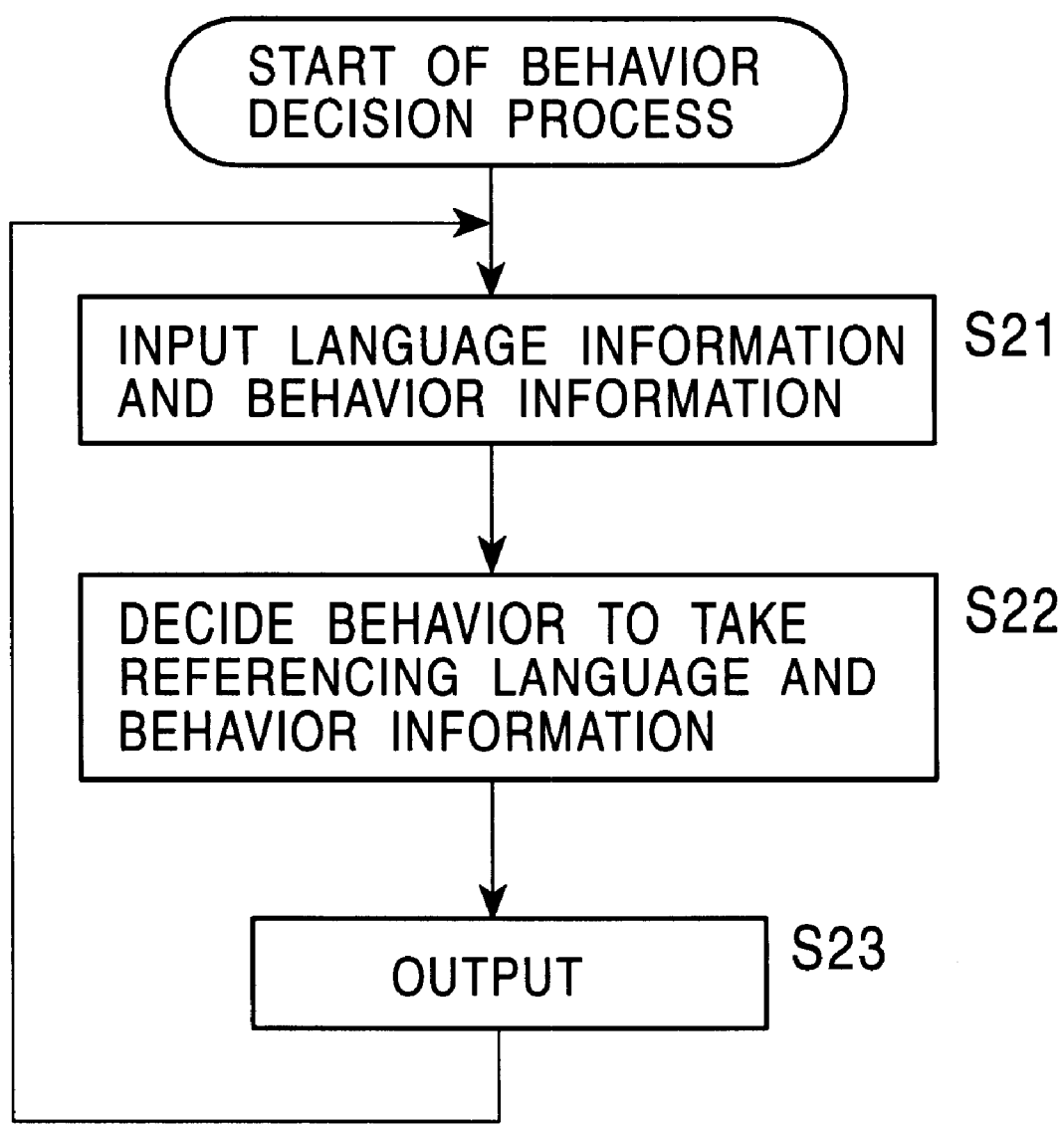
FIG. 12 is a flow diagram showing a behavior decision process.

The behavior table referencing unit 76 in the behavior decision unit 33 decides the behavior of the robot 1 using the language information as a result of voice recognition result and the behavior information as a result of image recognition. The operation of the behavior table referencing unit 76 is now discussed, referring to a flow diagram shown in FIG. 12. In step S21, the behavior table referencing unit 76 receives the language information from the keyword extractor 74 and the behavior information from the image recognizer 31B. In step S22, in response to the input language information and the behavior information, the behavior table referencing unit 76 uniquely decides the behavior of the robot 1, referencing the behavior table stored in the behavior table storage unit 77 and the behavior category table stored in the behavior category table storage unit 78.

The decision operation of the behavior table referencing unit 76 is now discussed. The decision operation is carried based on the table shown in FIG. 8. For example, three behaviors of approaching the user, getting away from the user, and ignoring the user are set up when the image recognition result (the behavior information) is "beckoning" and when the voice recognition result (the language information) indicates the command of "Come over here". When the user "beckons" and tells the robot 1 to "come", the robot 1 typically selects the action of approaching the user. However, if the robot 1 always responds the same way, the user may get tired of the response of the robot 1.

Even when the user makes the same gesture and speaks the same words, the robot 1 may be designed to respond differently. Which of the three behaviors to take may be decided in a sequential order, may be decided in a random fashion, may be decided with probability values, may be decided by a keyword, or may be decided depending on the emotion at the moment.

When the behavior decision is made with probability values, the behavior of approaching the user may have a probability of 50%, the behavior of getting away from the user may have a probability of 30%, and the behavior of ignoring the user may have a probability of 20%.

When the behavior decision is made according to a keyword, a combination of current action, current words, previous action, and previous words may be employed. For example, when the user clapped his hands in a previous action, and beckons in a current action followed by a spoken command of "Come over here", the robot 1 is designed to select the behavior of approaching the user by all means. When the user beat the robot 1 in a previous action, and beckons in a current action followed by a spoken command of "Come over here", the robot 1 is designed to select the behavior of getting away from the user.

In this way, a combination of current action, current words, previous action, and previous words may be employed in the decision of the behavior to take.

When the behavior decision is made depending on the emotion of the robot 1, the robot 1 references the information in the emotion/instinct model unit 32. For example, when the user beckons and tells the robot 1, which is currently in fear, to come to the user, the robot may approach the user. When the user beckons and tells the robot 1, which is currently angry, to come to the user, the robot 1 may ignore the user.

In this way, based on the language information and the behavior information, the behavior table referencing unit 76 decides the behavior referencing the behavior table. The behavior table referencing unit 76 notifies the posture transition unit 34 of the decided behavior in step S23 (see FIG. 12). The robot 1 performs predetermined operations in accordance with subsequent processes.

In the above embodiment, the direction at which the user points his finger is detected, and the object present in that direction is detected as the supplementary information. Alternatively, the supplementary information may be detected by detecting the direction at which the face of the user looks, the direction at which the eyes of the user look, and the direction at which the jaw of the user points.

Besides the above gestures, the standard pattern database 66 may store a diversity of other gestures to convey intentions and emotions, such as shaking up one's head up and down to express "yes", shaking one, head laterally to express "no", a victory or peace sign, a prayer, hurrah, or other various gestures.

Figure 13:
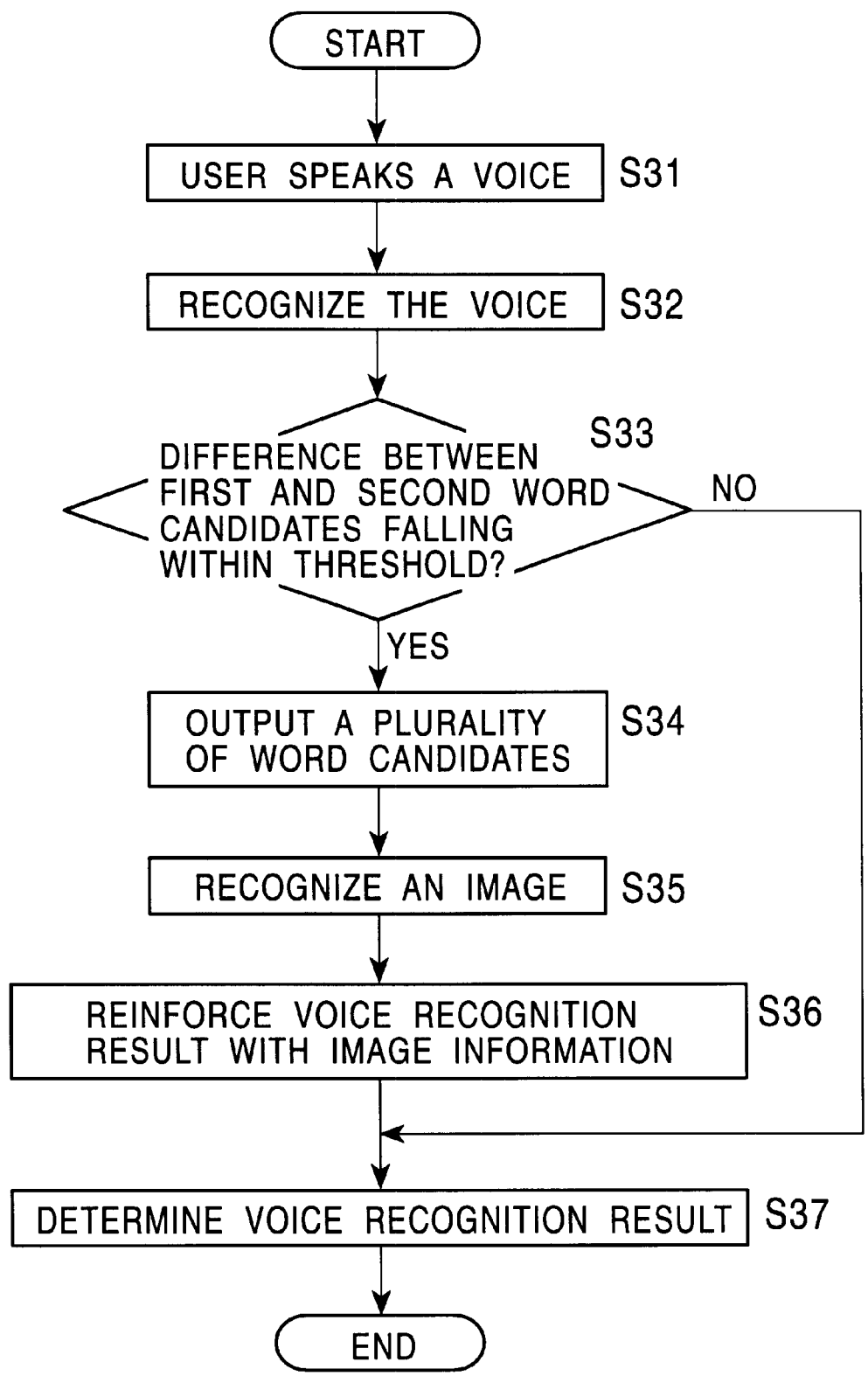
FIG. 13 is a flow diagram of a process which outputs a recognition result using voice information and image information.

When the robot 1 recognizes the voice of the user, the voice itself may be ambiguous (not clearly pronounced), causing an erroneous recognition. For example, the user may say "Please fetch a book" in an indistinctive voice, the sensor signal processor 31 may recognize that speech with an erroneous speech "Please fetch a hook". FIG. 13 is a flow diagram of a process in which such an erroneous recognition is avoided by the assistance of the image data.

When the user speaks, his voice is then picked up into the robot 1 by the microphone 15, and is input to the voice recognizer 31A in step S31. The voice recognizer 31A recognizes the input voice in step S32, thereby resulting in a plurality of word candidates which might have spoken by the user. A process step in step S33 is performed on the most likely first candidate and the second candidate.

In step S33, a determination is made of whether a score difference between the first candidate and the second candidate falls within a predetermined threshold. When it is determined that the score difference is out of the predetermined threshold, in other words, when the candidate is regarded as a recognition result without any problem because the first candidate is far distant from the second candidate, the process proceeds to step S37. The first candidate is now verified as a correct result.

When it is determined in step S33 that the score difference between the first candidate and the second candidate falls within the predetermined threshold, in other words, when it is determined that the first candidate may be an erroneous result, the process proceeds to step S34. A plurality of candidates having high scores are then processed. In step S36, image recognition is performed. In step S35, the image recognition process is performed on the image, which was picked up at the moment the voice was spoken by the user, or the image which had been picked up before the voice was spoken by the user or an image which was picked up after the voice was spoken by the user.

The voice recognition result is then reinforced using the image recognition result obtained in step S35.

As described above, when the user says "Please fetch a book", a first candidate is "Please fetch a book", and a second candidate is "Please fetch a hook". If the score difference between the first candidate and the second candidate falls within the predetermined threshold, it is difficult to determine which one is correct. When the image recognition result shows that a book is picture-taken in the image, the first candidate of "Please fetch a book" is determined to be correct. When the image recognition result shows that a hook is picture-taken in the image, the second candidate of "Pleas fetch a hook" is determined to be correct.

The voice recognition result is thus reinforced, and is verified as a correct result in step S37. When the voice recognition result is subject to ambiguity in this way, the use of the image recognition result helps ascertain the voice recognition result.

In the above discussion, only the first candidate and the second candidate are compared. Optionally, the first through tenth candidates may be compared to determine difference therebetween.

For example, a user A and a user B now talk. The user A says "Look at this". The user B says "What is that?". Such a conversation may be frequently exchanged in daily life. The user A uses "this" to indicate one object, while the user B uses "that" to indicate the same object. Demonstrative pronoun changes depending on the situation in this way.

Figure 14:
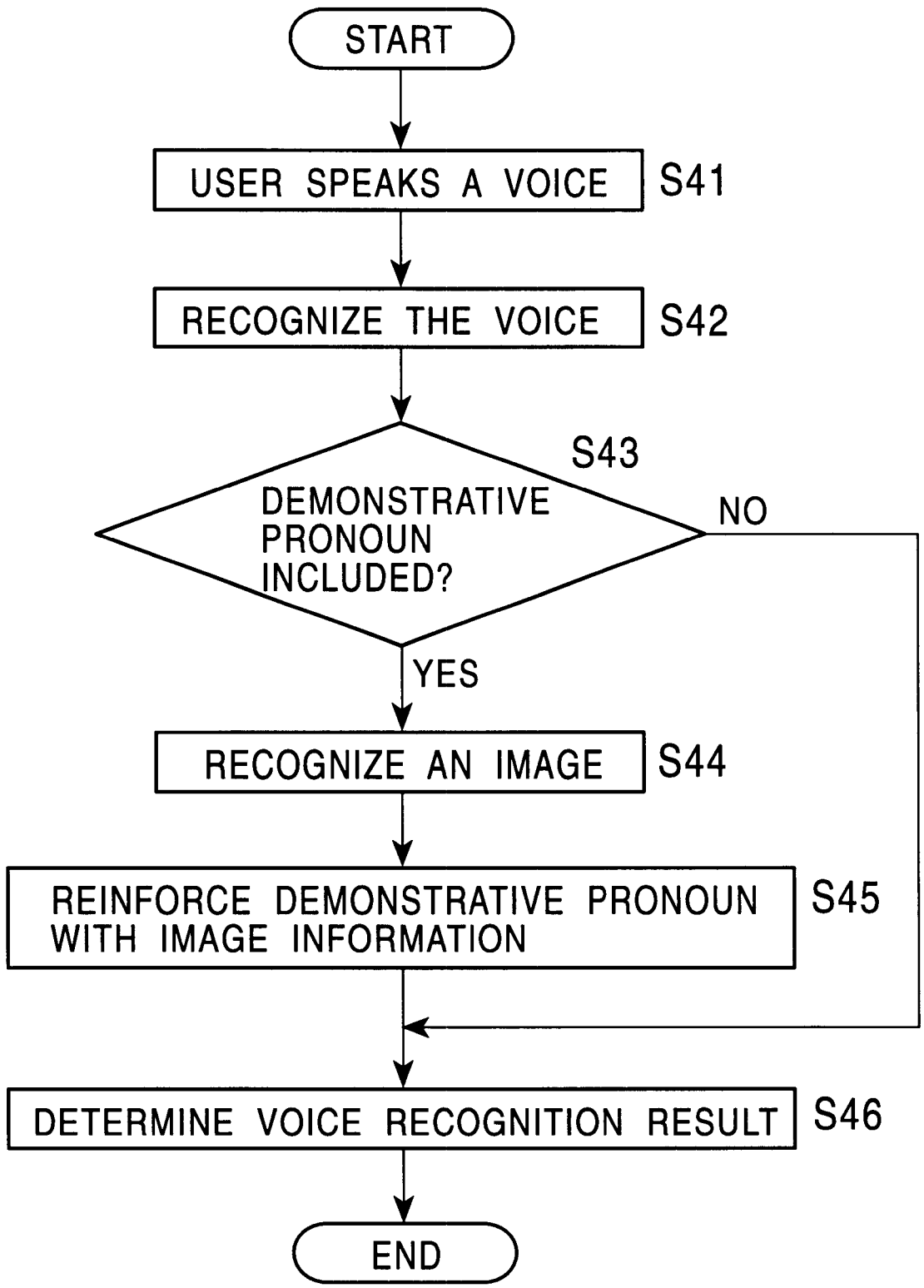
FIG. 14 is a flow diagram of another process which outputs a recognition result using voice information and image information.

The same thing can happen when the user talks with the robot 1. The robot 1 thus needs to recognize what the user indicates by a demonstrative pronoun. FIG. 14 is a flow diagram of a process in which the robot 1 determines the object of a demonstrative pronoun. In step S41, the user speaks, and in step S42, voice recognition is performed to recognize the voice of the user.

In step S43, a determination is made of whether the speech of the user contains a demonstrative pronoun based on the voice recognition result. When it is determined that no demonstrative pronoun is contained, the voice recognition result is verified as a correct result in step S46.

When it is determined in step S43 that the speech of the user contains a demonstrative pronoun, the process proceeds to step S44 for image recognition. Image recognition is performed on an image that was picked up when the user spoke, or an image that was picked up in a direction at which the user pointed his finger.

In step S44, image recognition is performed on the image, and the object of the demonstrative pronoun is thus determined using the image recognition result in step S45. For example, now the user says to the robot 1 "Fetch that". The user then indicates an object corresponding to "that" by a gesture, for example, by pointing his finger at the object.

In response to the speech of the user, in step S42, the robot 1 performs voice recognition, and then determines that the speech includes the demonstrative pronoun "that". The robot 1 also determines, from the image picked up at the moment of the speech, that the user has performed a gesture of pointing his finger at a direction.

In step S44, the robot 1 determines the direction at which the user points by the demonstrative pronoun "that", picks up the image at that direction, and performs image recognition on the taken image. For example, when the image recognition result shows that the object is papers, the object indicated by the demonstrative pronoun "that" is found to be "papers". When the object of the demonstrative pronoun is determined in this way in step S45, the process proceeds to step S46. The voice recognition result is thus verified as a correct result in step S46.

The object of a demonstrative pronoun is thus reliably recognized by using the image information.

Figure 15:
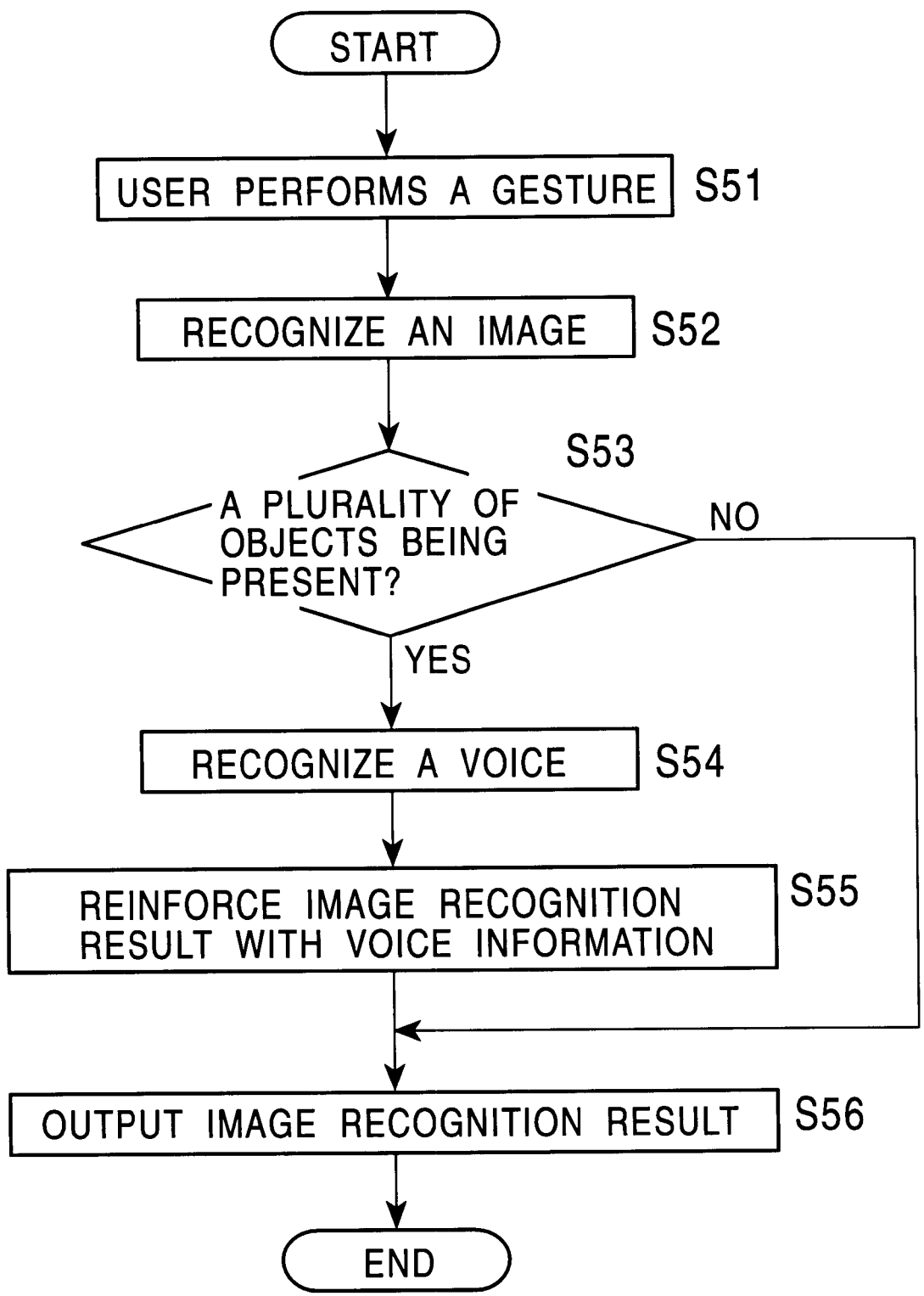
FIG. 15 is a flow diagram of yet another process which outputs a recognition result using voice information and image information.

When the robot 1 picks up an image, a plurality of objects may be present in that image. FIG. 15 is a flow. diagram of a process that determines which of the plurality of objects is indicated by the user in his speech. In step S51, the gesture, performed by the user and then picked up by the CCD camera 16, is fed to the robot 1.

When the gesture indicates a particular direction, the robot 1 needs to recognize an image of a scene in the direction at which the user points to gain supplementary information. The image of the scene in the direction indicated by the user is thus picked up, and the image recognizer 31B performs an image recognition process on the image in step S52. The image recognition result is used to determine in step S53 whether a plurality of objects is contained within the image. When it is determined in step S53 that no plurality of objects, i.e., a single object, is present, the process proceeds to step S56. The image recognition result of the object is thus output.

When it is determined in step S53 that a plurality of objects is contained within the image, the process proceeds to step S54, and voice recognition is performed. The voice, which was picked up when the user performed the gesture, is subjected to voice recognition. The voice recognition result in step S54 (the voice information) is used to reinforce the image recognition result in step S55. This process is more specifically discussed.

For example, the user says "Fetch a ball" while performing a gesture of pointing to a predetermined direction. The robot 1 responds to the gesture of the user, and recognizes that the user points to the predetermined direction in his gesture. The robot 1 picks up an image in the direction indicated by the user, and performs image recognition to the image. When the robot 1 determines that a plurality of objects is present within the image, the robot 1 performs voice recognition on a voice which was spoken by the user at the same time he performed the gesture.

When the voice recognition result shows the request "Fetch a ball", the ball is determined to be the one which the user wants most from among the plurality of objects within the image. The image recognition result is thus reinforced by the voice information. When the image recognition result is reinforced by the voice information, the process goes to step S56. The reinforced image recognition result is thus output.

The acquisition of accurate image information is thus possible by compensating for an ambiguous portion of the image information by means of the voice information.

A robot that acts in response to voice information only moves in a direction from which the voice of the user comes, while a robot that acts in response to image information only moves in a direction in a scene in which the user is located. The robot 1 of this invention decides the behavior desired by the user and actually moves accordingly, referring to a combination of voice information and image information. The behaviors of the robot 1 are categorized as listed in FIG. 9, as already described.

The behavior to take is decided by recognizing the voice of the user and detecting the current positions of the user and the robot 1 itself. Specifically, when the user says "Come over here", the robot 1 recognizes the speech, and then detects the position of the user from the image information. When a behavior of approaching the user is decided, the range and bearing to a target position are then determined.

Figure 16:
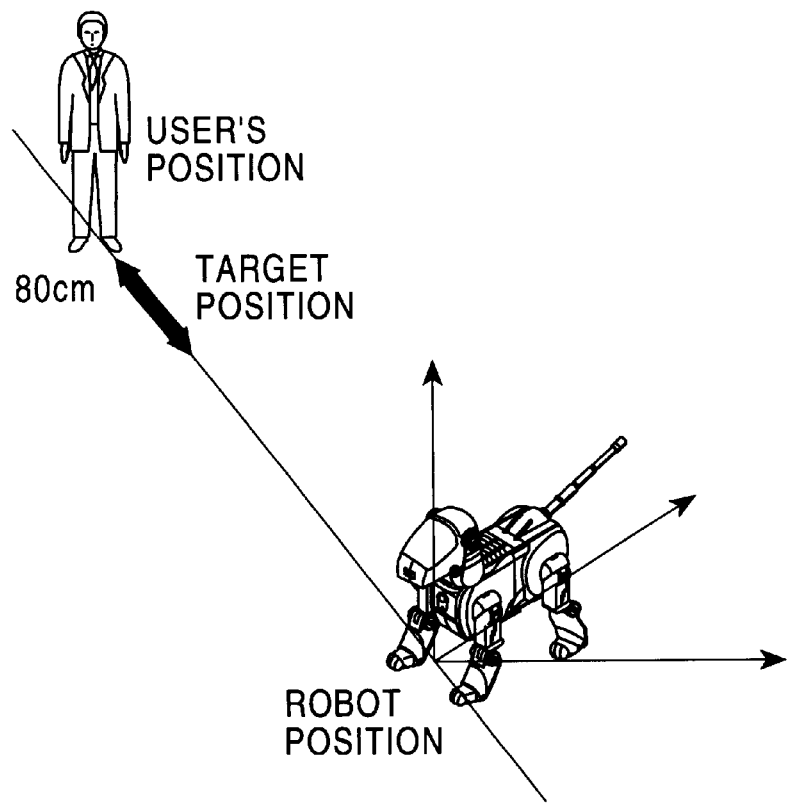
FIG. 16 illustrates the geometry of a user and a robot.

Referring to FIG. 16, the target position is set to be 80 cm away from and in front of the user. The face detector 63 recognizes the face of the user using the feature quantity extracted by the feature extractor 62 in the image recognizer 31B (see FIG. 6), and the range finder 64 measures the range between the robot 1 and the user referring to the size of the face of the user. Using the measured range, the robot 1 thus determines how far to go reach the target position which is 80 cm away from and in front of the user.

The behavior of the robot 1 in response to the gesture of the user becomes more accurate by measuring the position of the user and accounting for the measured position in the behavior.

The words actually spoken by the user are used in the above embodiment. The behavior of the robot 1 may be decided in response to the handclap sound of the user (a rhythm), or the footsteps of the user.

Figure 17:
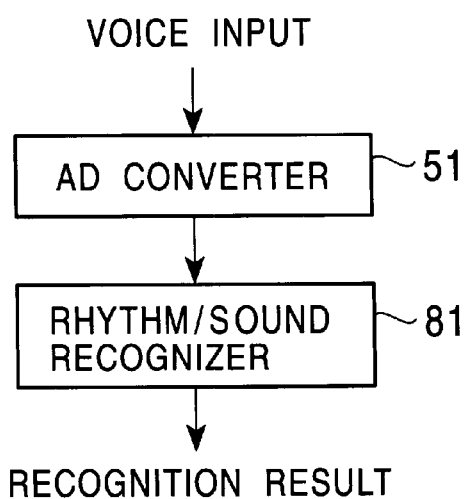
FIG. 17 shows another construction of the voice recognizer.

When the voice generated by the user includes the rhythm and sound, the voice recognizer 31A may be configured as shown in FIG. 17. The voice picked up by the microphone 15 is input to the AD converter 51 to be analog-to-digital converted. The digital data is then input to a rhythm/sound recognizer 81. The rhythm/sound recognizer 81 acquires information on rhythms and sounds.

The recognition result provided by the rhythm/sound recognizer 81 is fed to the behavior decision unit 33. FIG. 17 omits the portion for recognizing the user's voice, i.e., the portion shown in FIG. 5. The digital voice signal output from the AD converter 51 is fed to the feature extractor 52 (see FIG. 5), and to the rhythm/sound recognizer 81 (see FIG. 17).

The recognition result provided by the rhythm/sound recognizer 81 is fed to the behavior decision unit 33, but in this case, directly to the behavior table referencing unit 76, rather than to the text parser 71 (see FIG. 7), in the behavior decision unit 33.

The recognition method of the rhythm/sound recognizer 81 for recognizing a rhythm is now discussed. The rhythm/sound recognizer 81 detects rhythms by detecting beats of percussion instruments (including handclap sound of the user) or by detecting beats through a chord change. The detection result, indicating when the beat is detected, what measure, how many beats, etc., is output.

A detection method of rhythms is authored by Masataka GOTO and Yoichi MURAOKA in a paper entitled "A Sound Source Separation System for Percussion Instruments", Transactions of The Institute of Electronics, Information, and Communication Engineers of Japan, J77-DII, No. 5, pp. 901–911, 1994 and in a paper entitled "A Real-Time Beat Tracking System for Audio Signals", Transactions of The Institute of Electronics, Information, and Communication Engineers of Japan, J81-D11, No. 2, pp. 227–237, 1998. This disclosed method may be used in this invention.

Discussed next is a case in which the robot 1 dances as a behavior which the behavior decision unit 33 (the behavior table referencing unit 76) decides using the rhythm recognition result provided by the rhythm/sound recognizer 81. The behavior table storage unit 77 stores the behavior table as shown in FIG. 18. For example, when the rhythm recognition result shows that a binary measure is selected with a beat rate falling within a range of zero-to 60 beats a minute, the robot 1 selects a dance A. When the rhythm recognition result shows that neither of binary measure, nor triple measure, nor quadruple measure is selected with a beat rate falling within a range of zero to 60 beats, the robot 1 selects the dance A. In this way, the type of dance is uniquely determined by the information on measure and beat rate.

A predetermined process is performed in a stage subsequent to the behavior decision unit 33 in accordance with the behavior which the behavior table referencing unit 76 has decided referencing the behavior referencing the behavior table stored in the behavior table storage unit 77 in the behavior decision unit 33. The robot 1 is controlled accordingly.

In the above discussion, rhythm information is acquired from the voice. Alternatively, rhythm information may be acquired from the gesture of the user. To acquire a rhythm from gesturing, the image recognizer 31B shown in FIG. 6 works. The method of acquiring rhythm information from gesturing, authored by Seiji INOKUCHI in a paper entitled "Gesture-Recognition for Kansei Expression", Journal of the Robotics Society of Japan, Vol. 17, No. 7, may be used.

Optionally, rhythms may be acquired from both the voice and gesturing.

Discussed next is a case in which the behavior of the robot 1 is decided by sound. The sound recognition result provided by the rhythm/sound recognizer 81 may indicate the type of sounds such as footsteps or screaming, and the source of sounds of who or what emits sounds. For example, different behaviors may be expected depending on whether an undesirable person or a favorite person emits a sound, or depending on what emits a sound.

Figure 19:
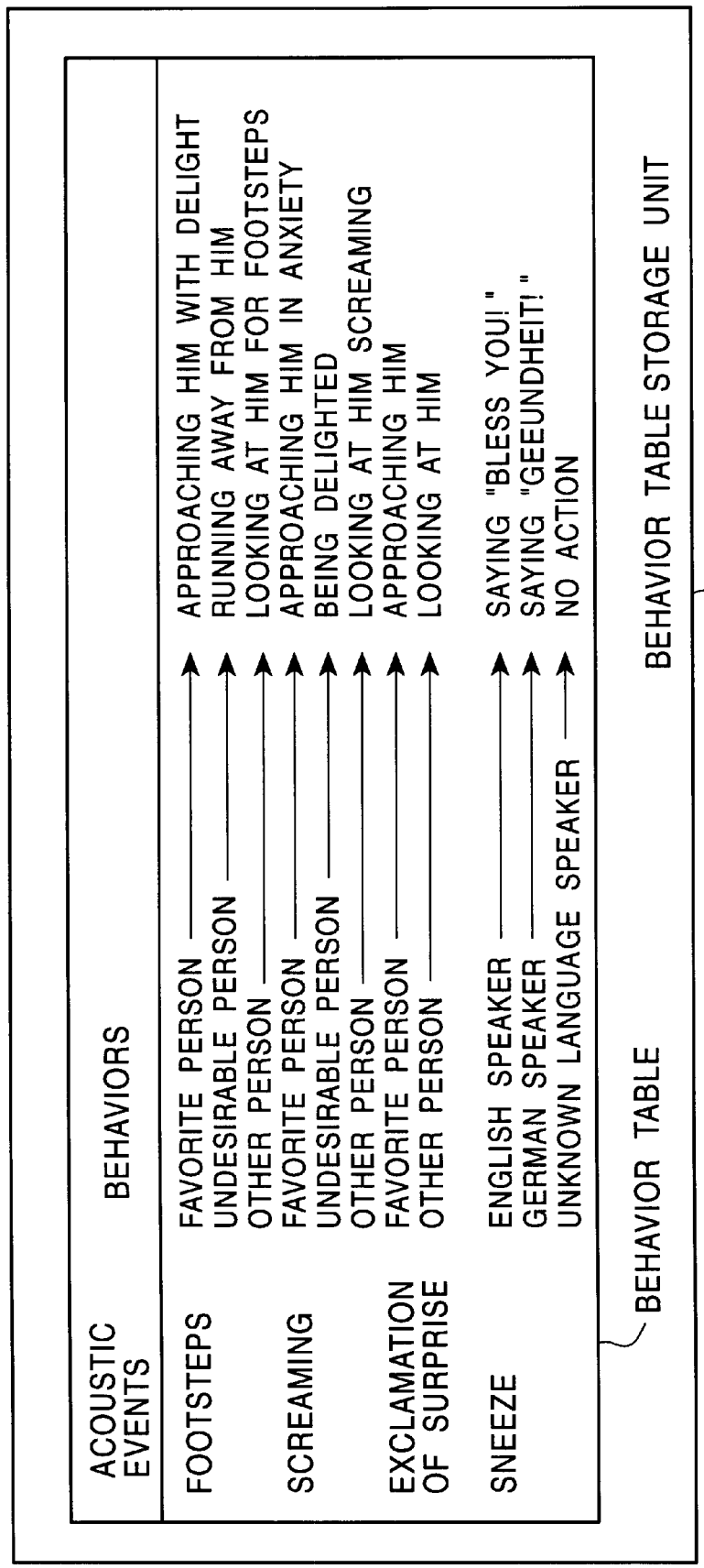
FIG. 19 shows yet another behavior table stored in the behavior table storage unit.

The recognition result provided by the rhythm/sound recognizer 81 is output to the behavior table referencing unit 76. The behavior table referencing unit 76 references the behavior table stored in the behavior table storage unit 77, thereby deciding the behavior matching the recognition result of the input sound. FIG. 19 is a table that lists the behaviors responsive to sounds stored in the behavior table storage unit 77.

Referring to the behavior table shown in FIG. 19, the behaviors are uniquely decided by the sound recognition result. For example, when the sound recognition shows that the robot 1 hears footsteps of one of favorite persons of the robot 1, the robot 1 approaches him with delight. Information about favorite persons and undesirable persons may be determined by the robot 1 itself based on conversations exchanged between the robot 1 and the user, and the attitude of the user.

The image information may be used together with sounds. For example, when the robot 1 hears footsteps, the robot 1 may determine from the footsteps who is coming. If the image is picked up and recognized, an approaching person is identified. The robot 1 thus determines whether the approaching person is a favorite person or an undesirable person of the robot 1, and then decides what action to take.

By combining the voice information and the image information, the robot 1 can perform a diversity of actions. In the recognition phase of the voice and the image in the behavior decision process, the robot 1 performs more accurate recognition process by combining these pieces of information.

The above series of process steps is performed in a hardware configuration. Alternatively, the above series of process steps may be performed using software. When the series of process steps is carried out by software, program codes forming the software are installed from a storage medium onto a computer having its own dedicated hardware or a general-purpose personal computer which executes a diversity of functions.

Figure 20:
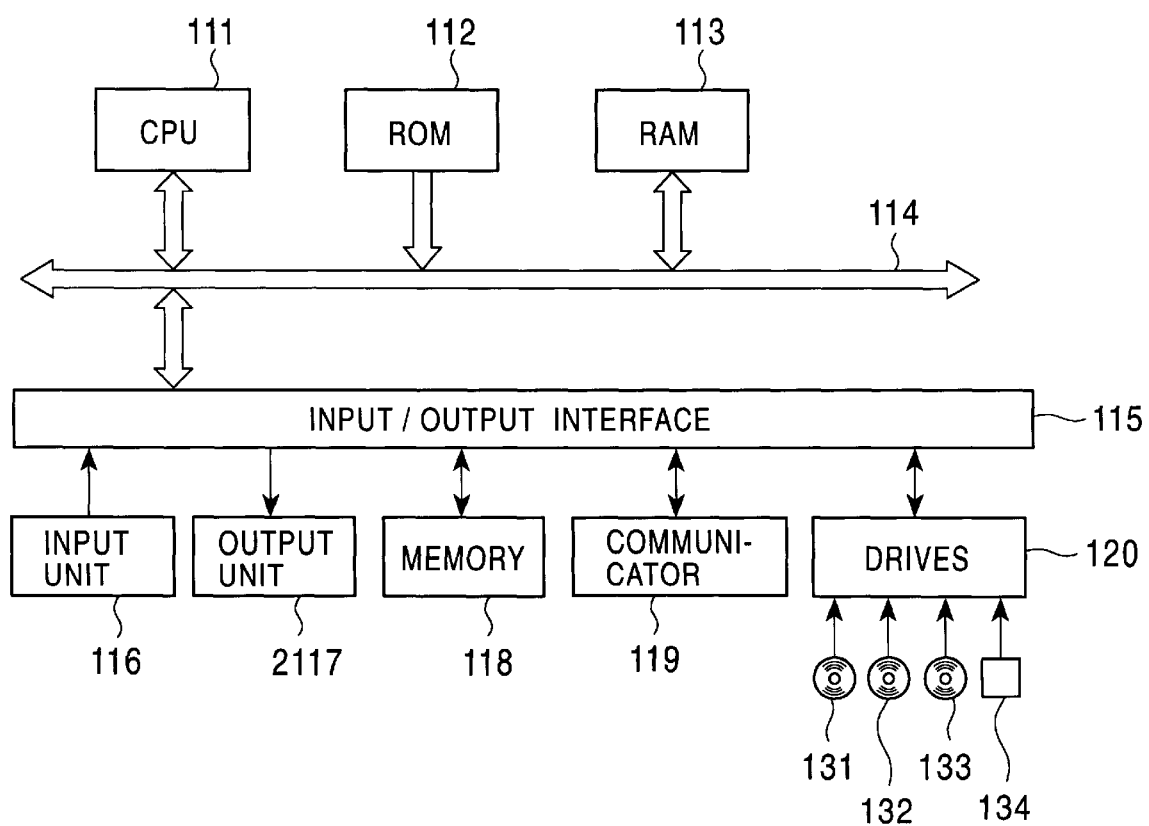
FIG. 20 shows storage media.

Referring to FIG. 20, storage media includes not only package media, which may be supplied to a user separately from a computer to supply a software program, such as a magnetic disk 131 (such as a floppy disk), an optical disk 132 (such as a CD-ROM (Compact Disk Read Only Memory)), a magnetooptical disk 133 (such as an MD (Mini-Disk)), or a semiconductor memory 134, but also a ROM 112 or a hard disk including a memory unit 118, each of which is supplied with a software program pre-installed thereon in a computer.

It is not necessary that the process steps describing the software program supplied in the storage medium be chronologically performed in the order stated in each flow diagram. Several process steps may be performed in parallel or separately.

In this specification, the system refers to a single entity composed of a plurality of devices.

In accordance with the present invention, the voice is recognized, the image is recognized, and at least one of the voice recognition result and the image recognition result is used to decide the behavior of the robot 1 to take. A more accurate voice and image recognition is thus performed.

What is claimed is:

1. An information processing device for use in a robot, comprising:
   voice recognition means for recognizing a voice;
   image recognizer means for recognizing an image;
   decision means for deciding the behavior of the robot based on at least one of the voice recognition result provided by the voice recognizer means and the image recognition result provided by the image recognizer means;
   determining means for determining, based upon said decided behavior, whether further measurement results are required; and
   measuring means for measuring said further measurement results when required.

2. The information processing device of claim 1, wherein said determining means determines that said further measurement results are required when said decided behavior requires a distance to be known.

3. An information processing device according to claim 1, further comprising storage means for storing a table that describes the relationship of the voice recognition result provided by the voice recognizer means, the image recognition result provided by the image recognizer means, and the behavior of the robot that is uniquely decided in accordance with the voice recognition result and the image recognition result.

4. An information processing device according to claim 1, wherein the decision means decides the behavior of the robot in accordance with the image recognition result uniquely determined by the image recognizer means when the voice recognition is not uniquely determined by the voice recognizer means.

5. An information processing device according to claim 1, wherein the decision means decides the behavior of the robot in accordance with the voice recognition result uniquely determined by the voice recognizer means when a plurality of objects is present within the area of an image recognized by the image recognizer means.

6. An information processing device according to claim 1, wherein the image recognizer means recognizes an image of a scene which is present in a direction to which one of predetermined portions of a user, from among a finger, a face, an eye, and a jaw of the user, points.

7. An information processing device according to claim 1, further comprising storage means for storing data of gestures performed by a user, wherein the image recognizer means recognizes the image of the user to detect a gesture matching the gesture data stored in the storage means, and regards the detected gesture as an image recognition result.

8. An information processing device according to claim 1, further comprising:
   detector means for detecting the face of a user; and
   range finder means for measuring a distance between the user and the robot based on the size of the face of the user detected by the detector means,
   wherein the decision means decides the behavior of the robot using the measured distance.

9. An information processing device according to claim 1, wherein the voice recognizer means detects a rhythm contained in background sounds, and treats the detected rhythm as a voice recognition result.

10. An information processing device according to claim 1, wherein the voice recognizer means detects an acoustic phenomenon from background sounds, and treats the detected acoustic phenomenon as a voice recognition result.

11. An information processing method of an information processing device for use in a robot, comprising the steps of:
  recognizing a voice;
  recognizing an image;
  deciding the behavior of the robot based on at least one of the voice recognition result provided in the voice recognizing step and the image recognition result provided in the image recognizing step;
  determining, based upon said decided behavior, whether further measurement results are required; and
  measuring said further measuring results when required.

12. A software program for an information processing device for use in a robot, comprising:
  an instruction for recognizing a voice;
  an instruction for recognizing an image;
  an instruction for deciding the behavior of the robot based on at least one of the voice recognition result provided in the voice recognizing step and the image recognition result provided in the image recognizing step;
  an instruction for determining, based upon said decided behavior, whether further measurement results are required; and
  an instruction for causing said device to measure said further measuring results when required.

13. A storage medium storing a software program for an information processing device for use in a robot, said robot comprising:
  a reader for reading said software program from said storage medium;
  said software program comprising:
    an instruction for recognizing a voice;
    an instruction for recognizing an image;
    an instruction for deciding the behavior of the robot based on at least one of the voice recognition result provided in the voice recognizing step and the image recognition result provided in the image recognizing step;
    an instruction for determining, based upon said decided behavior, whether further measurement results are required; and
    an instruction for causing said device to measure said further measuring results when required.

14. An information processing device for use in a robot, comprising:
  voice recognizing means for recognizing a voice;
  image recognizing means for recognizing an image;
  decision means for deciding the behavior of said robot based on said image recognition result provided by the image recognizer means;
  determining means for determining whether a particular single behavior has been decided; and
  if a single behavior has not been determined, then said decision means employs said voice recognition result provided by the voice recognizer means to decide on a particular behavior.

15. An information processing method for use in a robot, comprising:
  voice recognizer means for recognizing a voice;
  image recognizing means for recognizing an image;
  decision means for deciding the behavior of said robot based on said image recognition result provided by the image recognizer means;
  determining means for determining whether a particular single behavior has been decided; and
  if a single behavior has not been determined, then said decision means employs said voice recognition result provided by the voice recognizer means to decide on a particular behavior.

* * * * *